United States Patent
Xia et al.

(10) Patent No.: US 12,198,046 B2
(45) Date of Patent: Jan. 14, 2025

(54) REAL-TIME VISUALIZATION OF MACHINE LEARNING MODELS

(71) Applicant: Amazon Technologies, Inc., Seattle, WA (US)

(72) Inventors: Wei Xia, Seattle, WA (US); Weixin Wu, Seattle, WA (US); Meng Wang, Seattle, WA (US); Ranju Das, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1126 days.

(21) Appl. No.: 17/073,147

(22) Filed: Oct. 16, 2020

(65) Prior Publication Data

US 2021/0034980 A1   Feb. 4, 2021

Related U.S. Application Data

(63) Continuation of application No. 15/074,203, filed on Mar. 18, 2016, now Pat. No. 10,810,491.

(51) Int. Cl.
G06N 3/08    (2023.01)
G06N 3/04    (2023.01)

(52) U.S. Cl.
CPC ............... G06N 3/08 (2013.01); G06N 3/04 (2013.01)

(58) Field of Classification Search
CPC ............ G06N 3/04; G06N 3/08; G06N 20/00
See application file for complete search history.

(56) References Cited

U.S. PATENT DOCUMENTS

| | | | |
|---|---|---|---|
| 6,038,337 A | 3/2000 | Lawrence et al. | |
| 8,234,228 B2 | 7/2012 | Weston et al. | |
| 9,552,549 B1 | 1/2017 | Gong | |
| 9,928,448 B1 | 3/2018 | Merler | |
| 10,176,245 B2 | 1/2019 | Lim | |
| 10,410,096 B2 | 9/2019 | Dijkman | |
| 10,510,000 B1 | 12/2019 | Commons | |
| 10,810,491 B1* | 10/2020 | Xia | G06N 3/04 |
| 2012/0158623 A1* | 6/2012 | Bilenko | G06N 20/00 |
| | | | 706/12 |

(Continued)

FOREIGN PATENT DOCUMENTS

| | | |
|---|---|---|
| CN | 104112113 | 10/2014 |
| EP | 2833295 | 2/2015 |

OTHER PUBLICATIONS

Brescia, Massimo, et al. "DAME: A web oriented infrastructure for scientific data mining & exploration." arXiv preprint arXiv: 1010.4843 (2010). (Year: 2010).*

(Continued)

*Primary Examiner* — Randall K. Baldwin
(74) *Attorney, Agent, or Firm* — Robert C. Kowert; Kowert, Hood, Munyon, Rankin & Goetzel, P.C.

(57) ABSTRACT

A visualization tool for machine learning models obtains metadata from a first training node at which a multi-layer machine learning model is being trained. The metadata includes a parameter of an internal layer of the model. The tool determines a plurality of metrics from the metadata, including respective loss function values corresponding to several training iterations of the model. The tool indicates the loss function values and the internal layer parameter values via a graphical interface.

20 Claims, 12 Drawing Sheets

(56) References Cited

U.S. PATENT DOCUMENTS

| | | | |
|---|---|---|---|
| 2015/0324690 A1* | 11/2015 | Chilimbi | G06N 3/063 706/27 |
| 2015/0339570 A1* | 11/2015 | Scheffler | G06N 3/04 706/27 |
| 2015/0379424 A1 | 12/2015 | Dirac et al. | |
| 2017/0124487 A1* | 5/2017 | Szeto | G06F 11/1448 |
| 2017/0344884 A1 | 11/2017 | Lin | |
| 2018/0121768 A1 | 5/2018 | Lin | |
| 2018/0260668 A1 | 9/2018 | Shen | |
| 2018/0285682 A1 | 10/2018 | Najibi | |

OTHER PUBLICATIONS

Simard, Patrice, et al. "Ice: enabling non-experts to build models interactively for large-scale lopsided problems." arXiv preprint arXiv:1409.4814 (2014). (Year: 2014).*

Amershi, Saleema, et al. "Power to the people: The role of humans in interactive machine learning." Ai Magazine 35.4 (2014): 105-120. (Year: 2014).*

Berral, Josep Lluís, et al. "ALOJA: a framework for benchmarking and predictive analytics in Hadoop deployments." IEEE Transactions on Emerging Topics in Computing 5.4 (2015): 480-493. (Year: 2015).*

Martin Abadi, et al."TensorFlow: Large-Scale Machine Learning on Heterogeneous Distributed Systems", Nov. 9, 2015, Google AI: 1-19. (Year: 2015).*

Bolei Zhou, et al. "Learning Deep Features for Discriminative Localization", Dec. 14, 2015, arXiv: 1-10 (Year: 2015).*

McGregor, Sean, et al. "Facilitating testing and debugging of Markov Decision Processes with interactive visualization." 2015 IEEE Symposium on Visual Languages and Human-Centric Computing (VL/HCC). IEEE, 2015. (Year: 2015).*

Samek, Wojciech, et al. "Evaluating the visualization of what a Deep Neural Network has learned." arXiv preprint arXiv:1509.06321 (2015): 1-13 (Year: 2015).*

Kulesza, Todd, et al. "Principles of explanatory debugging to personalize interactive machine learning." Proceedings of the 20th international conference on intelligent user interfaces. 2015: 126-137 (Year: 2015).*

U.S. Appl. No. 15/045,030, filed Feb. 16, 2016, Chatterjee, et al.

Amazon Web Services, Amazon Machine Learning Developer Guide, Feb. 9, 2016, pp. 1-140.

Neural Network Basics, "A Basic Introduction to Feedforward Backpropagation Neural Networks," David Leverington, Associate Professor of Geosciences, downloaded from http://www.webpages.ttu.edu/dleverin/neural_network/neural_networks.html, Feb. 2, 2016, pp. 1-33.

"Gradient-Based Learning Applied to Document Recognition," Yann LeCun, et al., Proc. of the IEEE, Nov. 1998, pp. 1-46.

"ImageNet Classification with Deep Convolutional Neural Networks," Alex Krizhevsky, et al., 2012, pp. 1-9.

Wikipedia, "Convolutional neural network," Jan. 19, 2016, pp. 1-9.

"Best Practices for Convolutional Neural Networks Applied to Visual Document Analysis," Patrice Y. Simard, et al., Microsoft Research, One Microsoft Way, Redmond WA 98052, 2003, pp. 1-6.

U.S. Appl. No. 15/719,402, filed Sep. 28, 2017, Mohammed Hidayath Ansari et al.

Wang, et al., "Learning Deep Representations for Scene Labeling with Semantic Context Guided Supervision," Jun. 9, 2017, https://arxiv.org/pdf/1706.02493.pdf, pp. 1-13.

Yan et al., "Semantic Indexing with Deep Learning; A Case Study," 2016, Open Access/Big Data Analytics, BioMed Central, pp. 1-13.

Liberda, et al., Image Segmentation and Convolutional Neural Networks as Tools for Indoor Scene Understanding, 2016, Bachelor's Thesis at Signals and systems—SSYX02-16-31, https://publications.lib.chalmers.se/records/fulltext/242058/242058.pdf, pp. 1-56.

* cited by examiner

REAL-TIME VISUALIZATION OF MACHINE LEARNING MODELS

This application is a continuation of U.S. patent application Ser. No. 15/074,203, filed Mar. 18, 2016, now issued as U.S. Pat. No. 10,810,491, which is hereby incorporated by reference herein its entirety.

BACKGROUND

As the costs of data storage have declined over the years, and as the ability to interconnect various elements of the computing infrastructure has improved, more and more data pertaining to a wide variety of applications can potentially be collected and analyzed using increasingly sophisticated machine learning algorithms. The analysis of data collected from sensors embedded within airplane engines, automobiles, health monitoring devices or complex machinery may be used for various purposes such as preventive maintenance, proactive health-related alerts, improving efficiency and lowering costs. Streaming data collected from an online retailer's websites can be used to make more intelligent decisions regarding the quantities of different products which should be stored at different warehouse locations, and so on. Data collected about machine servers may be analyzed to prevent server failures. Photographs and videos may be analyzed, for example, to detect anomalies which may represent potential security breaches, or to establish links with other photographs or videos with a common subject matter.

The increase in the use of powerful machine algorithms has been accompanied by (and in some cases made possible by) the increasing use of commodity hardware. The advent of virtualization technologies for commodity hardware has provided additional benefits with respect to managing large-scale computing resources for many types of applications, allowing computing resources to be efficiently and securely shared by multiple customers. Some cloud-based provider networks may offer the combination of storage services (which may be used as repositories of very large input data sets for machine learning models, as well as output produced by the models) and machine learning services (which may be used to train, test and evaluate desired types of machine learning models).

Some machine learning algorithms, including for example various types of neural network models used for "deep learning" applications, may comprise a number of internal layers, also referred to as "hidden" layers, each with their own sets of parameters. While such algorithms may be very effective at complex tasks such as image recognition, it may take numerous compute-intensive iterations to train the system to identify appropriate values of the model parameters. As a result, for some models it may take days to determine the final parameters, typically with little insight being provided during the training phase into the operations being performed at the internal layers. Tuning and debugging such complex models may present a non-trivial challenge.

Figure 1:
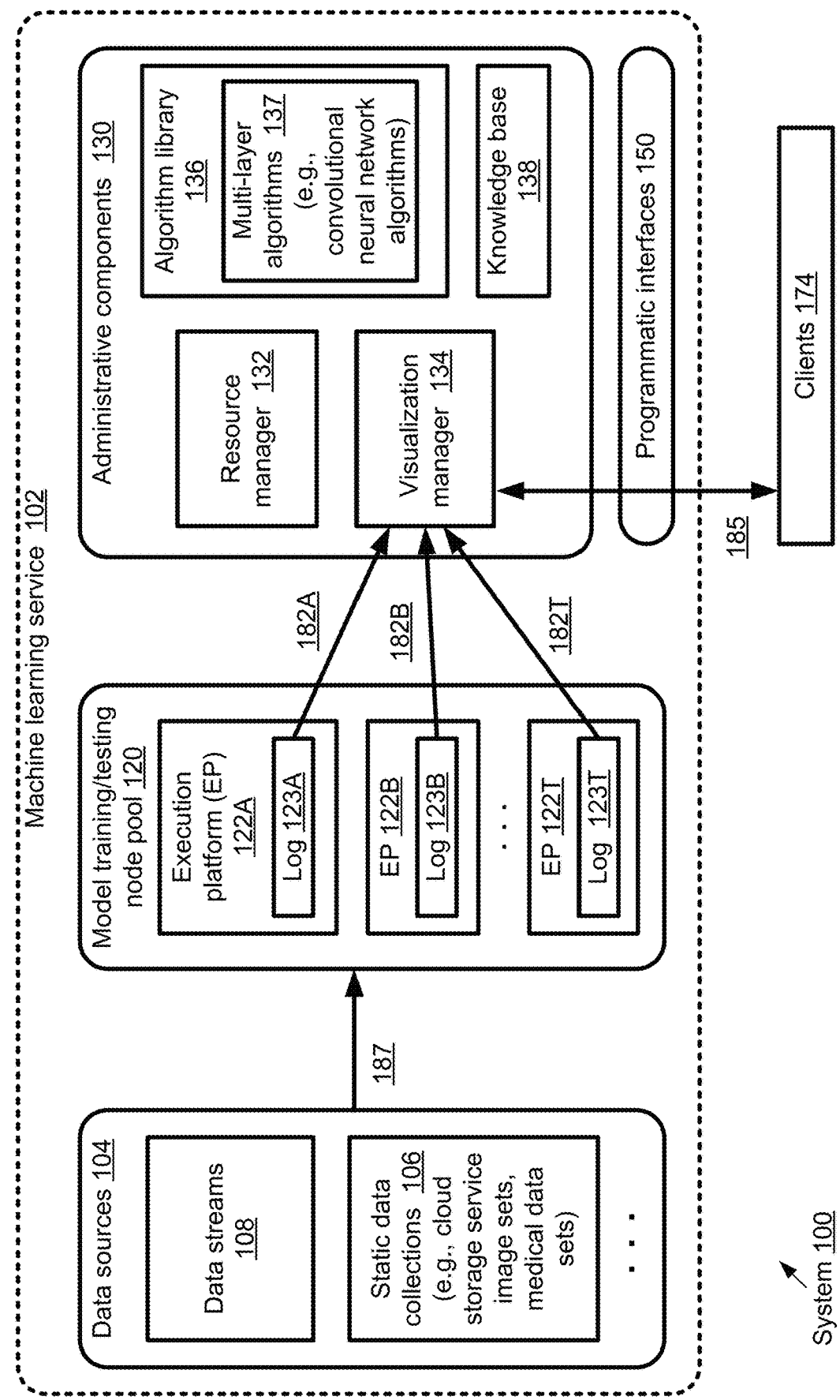
FIG. 1 illustrates an example system environment in which real time visualizations of various characteristics of complex machine learning models may be provided to clients, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for generating visualizations enabling tuning and debugging of complex multi-layer machine learning models are described. In some embodiments a pool of execution platforms which can be used for training, testing and production runs of machine learning models may be obtainable by clients from a machine learning service implemented at a provider network. The control-plane or administrative portion of the machine learning service may include visualization components responsible for collecting, processing and displaying information about the models in various embodiments. Networks set up by an entity such as a company or a public sector organization to provide one or more network-accessible services (such as various types of cloud-based computing, storage, or machine learning services) accessible via the Internet and/or other networks to a distributed set of clients may be termed provider networks herein. A provider network may sometimes be referred to as a "public cloud" environment. Resources of some of the services may be used for supporting other services: for example, a storage service may be used as a repository for large data sets to be used to train and test models at the machine learning service, the execution platforms used for the models may be managed by a computing service of the provider network, and so on.

Some machine learning problems such as object recognition, face recognition, anomaly detection and the like may be addressed by training sophisticated multi-layer models. For example, convolutional neural network models have been known to work well for object recognition. As discussed below in the context of FIG. 2, convolutional neural network models may include several internal layers, each of which may in turn comprise several different feature processing filter maps with respective sets of parameters such as weight vectors. In many cases, numerous training iterations and/or test runs may be performed before any given model converges. Especially for large data sets, the training of a single model may sometimes take hours or days. Because the quality of a model's results may typically depend on the structure of the model (e.g., how many layers are included in the model, the kinds of processing performed at each layer, the interconnections between the layers and so on) and the parameters (e.g., weights, activation biases and the like) selected for the model, a number of model variants with differing initial parameters or structures may often be trained in parallel using a given input data set. Assuming that enough resources are available, such a parallel training approach may enable data scientists to obtain high-quality models more quickly than if a sequential approach were used, in which parameters and/or model structures may only be adjusted after each sequential run.

During each model training iteration, numerous features and parameters of the model's internal layers may be adjusted, e.g., using a gradient-based learning algorithm. In a provider network environment in which dozens or hundreds of model variants are being trained concurrently on a given data set, millions of parameters may potentially be modified iteratively. By default, the computations and parameter adjustments of the internal layers may often be hidden. In some cases a given complex model may be considered the equivalent of a black box, with little information being made available to data scientists regarding the progress (or lack of progress) being made at internal layers of the models. Debugging and/or tuning models in such environments may be difficult—for example, it may take hours or even days to discover that a particular model structure or a particular set of input parameters resulted in poor-quality predictions. As a result, computational resources which were used for such less-than-optimal models may have been wasted.

In some embodiments, to help provide more timely insights into the training and/or testing of a model, a machine learning service (or more generally, a machine learning training/testing environment which may not necessarily be implemented as part of a provider network service) may comprise a visualization manager. The visualization manager, which may itself be implemented in a distributed manner using a plurality of computing devices in some embodiments, may collect locally-generated metadata from each of several training nodes at which respective model variants or instances are being trained concurrently. In one embodiment, for example, at least some of the execution platforms being used to train or test a model may store metadata entries in a local log file or log data structure, indicating for example the structure of the model, initial parameters of various layers, modified parameters of various layers, loss function values pertaining to respective training iterations, test results or scores corresponding to respective test runs, filter maps and their outputs, weights, biases, and/or other model properties. The visualization manager may obtain such log entries, e.g., using a pull model (in which new log entry contents are retrieved in response to respective requests issued by the visualization manager), a push model (in which the nodes at which training or testing of the models is being performed transmit log entries to the visualization manager on the nodes' initiative), or some hybrid push-pull approach. The raw log entries or other similar model metadata sources may sometimes be formatted in a fairly cryptic manner, which may not be easily parsed by customers on whose behalf the models are being generated.

The visualization manager may process and correlate the model metadata collected from various nodes. Metrics which can be used to compare different concurrently-trained model variants may be generated and displayed using a dynamically updated easy-to-understand visualization interface (e.g., a web-based console or graphical user interface) in various embodiments. The visualizations may be provided to clients while the models are still being trained in at least some embodiments; that is, the visualization manager may not have to wait until a given model has converged or until the training resources designated for the given model have been exhausted before displaying information that can be used to tune or debug the model. In one implementation, the model visualizations may be presented to clients in real-time or near real-time—e.g., as soon as (or very shortly after) a loss function is computed for a given model training iteration, a loss function display pertaining to the model may be updated. A number of different programmatic controls (e.g., web-based controls such as sliders, drop-down menus, text boxes and the like) may be provided to clients in various embodiments, enabling them to drill down into the details of selected internal model layers, to select specific model variants whose metrics are to be compared visually, to replay changes that have occurred during successive training iterations, and so on. According to one embodiment, a representation of a feature processing filter associated with a particular layer of a particular training iteration may be displayed, along with a representation of an output of the feature processing filter for that iteration. By examining the filters and their outputs for successive iterations, the progress being made by the model may be made apparent in such embodiments. Furthermore, by comparing metrics and parameters corresponding to the Nth iteration of two different models, it may become easier to determine whether both models are worth training further using their current parameters, or whether it may make sense to modify the parameters of one or both of the models and/or restart the training phase.

In addition to information collected with respect to training, in at least one embodiment the visualization manager may also provide insights into the results of tests or evaluation runs—e.g., respective metrics indicative of a model's prediction quality or scores for various test/evaluation runs may be displayed. In some embodiments, the visualization interface may also be used to provide low-dimensional mappings of model outputs. For example, the prediction results of a complex model may be expressed initially in a large number of dimensions. In order to make the results more understandable, the high-dimension values may be mapped by the visualization manager into a two-dimensional or three-dimensional view and displayed to a client. Such reduced-dimension mappings may help to indicate how well different models are able to differentiate or distinguish among predicted classes—e.g., the extent of overlap between a first predicted class and a second predicted class may become apparent from such visualizations. In at least one embodiment, information about the amount of resources which are consumed for various iterations of training and/or various test runs may be displayed, enabling clients to make budget-related decisions (e.g., decisions to stop training of a selected model) in a data-driven fashion. In at least one embodiment, based on various client-specified or system-generated triggering criteria, a visualization manager may provide recommendations regarding parameter changes and/or warnings or alerts regarding anomalous or unexpected model behavior.

It is noted that the visualization of information pertaining to the internal layers, training iterations or test runs of complex models may not necessarily require the resources of a machine learning service of a provider network in at least some embodiments. That is, a standalone visualization tool installed at one or more computing devices unaffiliated with any particular service may be instantiated in some embodiments, capable of extracting the requisite log entries or other metadata and processing the collected metadata to provide dynamically updated displays of various characteristics of one or more machine learning models. In some embodiments, instead of being incorporated within a machine learning service, model metadata collection and display capabilities similar to those described above may be implemented at a separate visualization service. Such a visualization service may be used to display information collected programmatically from a variety of sources (including for example resource monitoring agents of a data center), at least some of which may not be directly related to machine learning.

Example System Environment

FIG. 1 illustrates an example system environment in which real time visualizations of various characteristics of complex machine learning models may be provided to clients, according to at least some embodiments. As shown, system 100 comprises various resources of a machine learning service 102 which may be implemented at a provider network. The machine learning service 102 comprises a model testing and training node pool 120 with numerous execution platforms 122 (such as platforms 122A, 122B and 122T). At a given point in time, a subset or all of the execution platforms 122 may be allocated to train respective variants or instances of a machine learning model using a training data set stored at one or more data sources 104. Several different types of data sets may be available from the data sources 104, including continuously collected data streams 108 and/or static data collections 106. Examples of static data collections 106 may include photographs or images stored in cloud storage services on behalf of various clients, medical images such as X-rays, FMRI (functional magnetic resonance imaging) results, video archives, etc. In some embodiments a given data set used to train a set of model variants may be quite large: e.g., it may comprise hundreds of gigabytes or even terabytes of observation records. In at least one embodiment the raw data records may be stored at a storage service of a provider network, and the data sources 104 may comprise pointers to or identifiers of the objects which contain the raw data at the storage service. For some machine learning algorithms, raw data may be pre-processed (e.g., operations such as data cleansing, normalization, and the like may be performed) before it is used to train models. In such embodiments, some data sources 104 may represent the pre-processed versions of the original observation records.

A client 174 of machine learning service 102 may, for example, submit a request via a programmatic interface 150 to an administrative or control-plane component of the service to train one or more models using a specified algorithm and data set. The administrative components 130 may include a resource manager 132, an algorithm library 134, a knowledge base 138 and a visualization manager 134 in the depicted embodiment. Generally speaking, the machine learning service 102 may cater to customers with a variety of levels of expertise with respect to machine learning. Some customers may be very knowledgeable, and may provide detailed guidance such as an indication of the number of model variants to be trained concurrently, the model structures and parameters for each of the variants, etc. Other customers may simply indicate a high-level modeling objective (e.g., a request to classify a set of animal images into either cats or dogs may be submitted) and leave the details of the learning algorithms to the service. In the latter scenario, the control-plane components 130 of the machine learning service may select various properties of the modeling approach to be employed, including for example the specific algorithm to be used, the structure and parameters of the models, and so on.

In the depicted embodiment, the resource manager 132 may be responsible for generating an execution strategy to fulfill a client's model training request. The resource manager may determine the number of distinct execution platforms 122 to be deployed on behalf of the client, select which specific execution platforms 122 from among the available pool of platforms are to be used, and configure the selected platforms to obtain input data from data source 104 as indicated by arrow 187. The knowledge base 138 may comprise a number of entries indicative of previous experiences with respect to various algorithms and data sets—e.g., a particular knowledge base entry may indicate that for certain types of problems, neural network models with K or more layers worked well, and P or more such model variants with different input parameters should preferably be trained in parallel. For some requests for which clients 174 do not provide detailed guidance, the knowledge base 138 may be consulted to decide on an execution strategy A wide variety of algorithms with different levels of complexity may be available from algorithm library 136 in the depicted embodiment, including numerous types of regression and classification algorithms. Various multi-layer algorithms 137, including for example convolutional neural network algorithms (as well as other neural network algorithms) suitable for object recognition and other deep-learning problem domains may be supported in at least some embodiments.

In response to a particular model request received via interfaces 150, one or more execution platforms 122 may be deployed. Several different variants of the model may be trained and tested in parallel using a given input data set in some embodiments, e.g., in an effort to reduce the total time taken to arrive at high-quality predictions. In some embodiments a 1-to-1 mapping may exist between model variants and execution platforms 122, while in other embodiments 1-to-M mappings (in which multiple execution platforms are used for a single model variant) or M-to-1 mappings (in which multiple model variants are processed at the same execution platform) may be used. The model variants may differ from one in another in various characteristics—e.g., in the model structure (e.g., the number of layers of various types of a convolutional neural network model), the initial parameters, the learning rates, etc. At least for some machine learning algorithms, multiple iterations of training and/or multiple test runs may be performed, e.g., until a model meets a convergence criterion or meets a desired quality metric.

At various execution platforms 122, a respective local log 123 may be maintained to track the training and/or testing operations being performed—e.g., log 123A may be generated at execution platform 122A, log 123B may be generated at execution platform 123B, and so on. A given log 123 may comprise a plurality of entries, and a given entry may include various elements of data and/or metadata associated with the model(s) for which processing is being performed at the execution platform. For example, a log entry may contain information about the number and nature of the layers of a neural network model, the parameters associated with subcomponents at various layers, the loss function or objective function value computed for a recent training iteration, the scores obtained from a recent test run, and so on. A variety of data structures and/or objects may be used for logs and their entries in different embodiments—e.g., in one embodiment log entries may be stored in text format on persistent storage devices, while in another embodiment the log entries may be stored in binary format in main memories of the execution platforms. In some embodiments, circular logs may be used (in which older log entries are eventually overwritten by newer log entries while the total space allocated for the log remains fixed), while in other embodiments a rolling log scheme may be used in which a new log file or object is generated periodically.

The visualization manager 134 may collect log entries from the execution platforms 122 in the depicted embodiment, as indicated by the arrows labeled 182 (e.g., 182A, 182B, or 182T). In some implementations the execution platforms may initiate the transmission of the log entries, e.g., in batches of selected sizes or at the ends of various training iterations or test runs, while in other embodiments the visualization manager 134 may submit explicit requests for log entries in response to triggering conditions (e.g., after specific time intervals). Using the contents of the log entries, the visualization manager may generate or produce visualizations of respective sets of metrics for different model variants, which may be used for example to compare the relative progress or accuracy of the different models at various stages during their training and testing phases. For example, the values of the objective functions or loss functions after each of iterations K, (K+1), (K+2), etc., of two model variants MV1 and MV2 being trained using an identical training data set may be displayed using a dynamically updated interface 150 to clients 174. Similarly, the scores achieved in various test runs using a given test data set may be displayed dynamically. Parameters associated with internal or hidden layers, such as various feature processing filters and their outputs, weights, gradients, etc. corresponding to different iterations may be displayed in the depicted embodiment. In various embodiments, clients may issue programmatic requests to the visualization manager 134, indicating the particular model variant or variants for which visualizations 185 are to be provided. In some implementations clients 174 may use interactive control elements of the interface (e.g., by clicking on a portion of a model layout) to indicate the particular layer or feature they wish to inspect visually, to zoom in on a particular iteration's details, and so on. In at least some embodiments, the visualizations 185 may be provided in real time or near real time—for example, within a few seconds of the completion of a particular training iteration, the value of the loss function value corresponding to that iteration may be displayed. Each model variant may have an associated identifier in the depicted embodiment, and clients 174 may use such identifiers to indicate the particular subset of model variants for which data is to be displayed. In at least one embodiment, a client 174 may be able to view the rate of change of a particular parameter or attribute of a model—e.g., by replaying the values of the model in a video or moving-image format.

In some embodiments, the visualization manager may generate alerts or warnings if selected metrics meet triggering criteria. For example, if a particular metric (e.g., a loss function) is generally expected to decrease from one training iteration to the next, and instead is found to have increased over four successive iterations, a warning or alert may be generated and provided to the client 174 via the dynamically updated visualization interface. In some embodiments, the visualization manager may be designed to provide recommendations for changes—e.g., to suggest, based on analysis of data collected from the logs 123, that a particular parameter value of a model should be changed or even that further training/testing of a particular model should be abandoned. In some embodiments, the visualization manager 134 may transform high-dimensional model results (which may for example comprise values of thirty or forty attributes) into easier-to-understand low-dimensional representations (e.g., into two-dimensional or three-dimensional graphs). The reduced-dimension representations of the model output may be helpful in indicating which of a given set of model variants is best able to distinguish among distinct classes—e.g., one object recognition model variant MV1 may be able to identify a relatively wide "boundary" (as expressed in the lower-dimensional representation) between images of dogs and images of cats, while a different model variant MV2 may show considerable overlap in its classifications of the images (and may potentially be considered of lower quality than MV1 as a result).

Convolutional Neural Network Example

Figure 2:
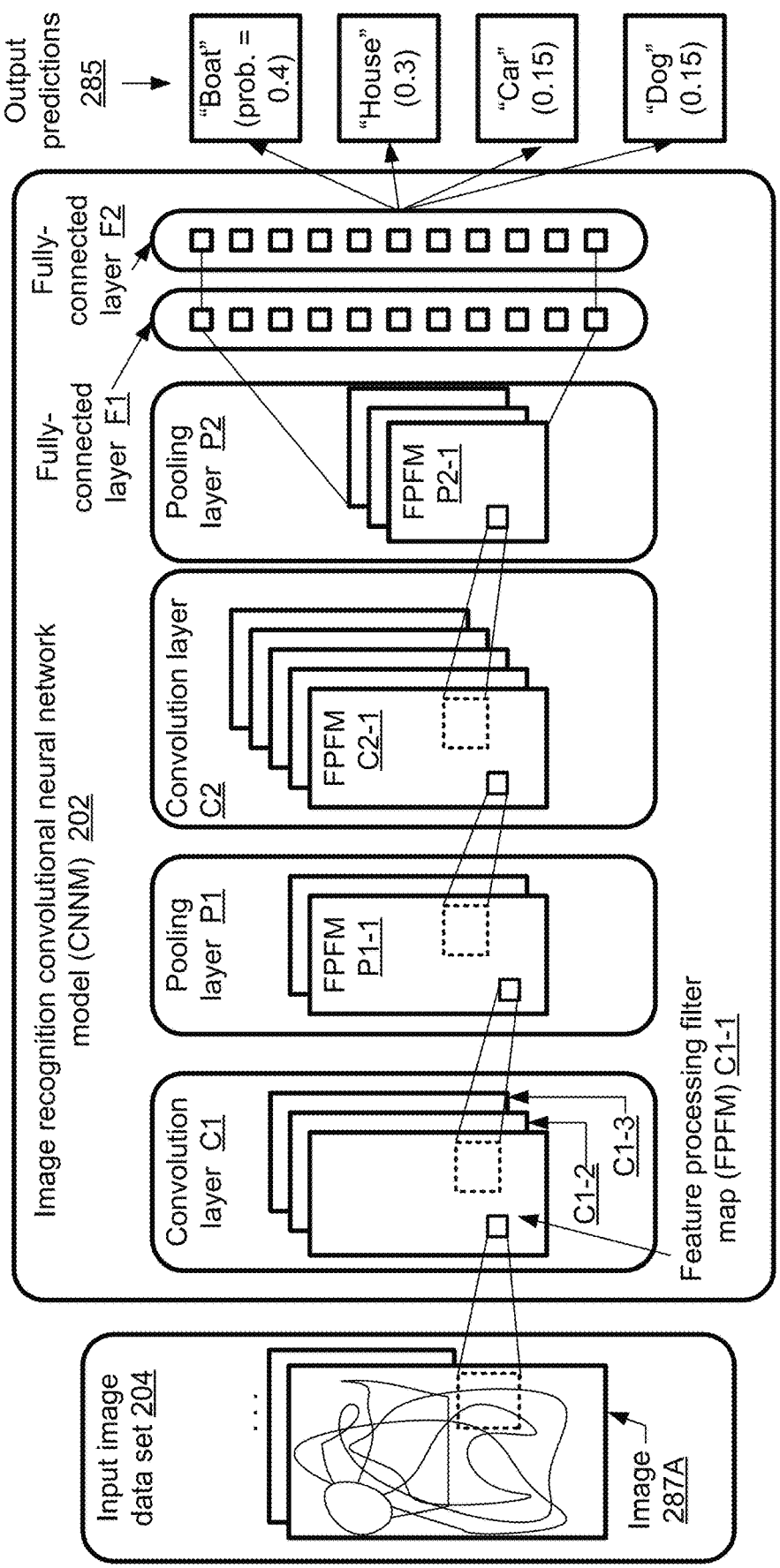
FIG. 2 illustrates an example of a convolutional neural network model, according to at least some embodiments.

The visualization techniques described above may be applied to a wide variety of machine learning algorithms and models in different embodiment, including but not limited to various types of neural network based models which may contain multiple internal or hidden layers. FIG. 2 illustrates an example of a convolutional neural network model, according to at least some embodiments. An image data set 204 comprising a plurality of images 287 (e.g., 287A) is used as input to an image recognition convolutional neural network model 202. For a given image 287, the model 202 produces a probability distribution corresponding to a set of target objects, indicating the relative probability that the image comprises each one of the objects. For example, the output predictions 285 for image 287A may indicate that, in a test run conducted after model 202 has undergone a number of training iterations, a probability of 0.4 (40%) is assigned to the scenario that image 287A includes a representation of a boat. Similarly, respective probabilities of 0.3 (30%), 0.15 (15%) and 0.15 (15%) are assigned to the scenario that image 287A comprises a representation of a house, a car or a dog. In general, the output produced by the model (e.g., the respective probabilities for different objects) may change from one test run to another. In contrast to training runs, a test run may only require one feed-forward processing phase of the model (using the parameter values that have been identified via the training conducted thus far); as such, a given test run may not require multiple iterations. At least for some types of image recognition models the respective probabilities for different objects need not add up to 100% (e.g., a given image may comprise both a car and a boat).

Generally speaking, a convolutional neural network model such as model 202 used for object recognition combines the concepts of local receptive fields, shared or replicated weights, and spatial or temporal sub-sampling. The model comprises a number of layers, such as convolution layers C1 and C2 of model 202, pooling or sub-sampling layers P1 and P2, and fully-connected layers F1 and F2. With respect to the convolution layers and the pooling layers, a given layer comprises a number of units (logically representing respective artificial neurons being trained), with each unit receiving input from a small set of units located in a common neighborhood in the previous layer. This approach towards local receptive fields is modeled on the manner in which the neurons of the visual system of various animal species work. With such local information, the neurons at a given layer may eventually learn to recognize elementary visual features such as corners, endpoints, boundaries, etc. Such elementary features may then be combined in subsequent layers of the model to form higher-order features (e.g., doors, windows, etc. in the case of an image of a house). Elementary feature detectors useful in one part of an image 287 may be equally useful in detecting similar features in other parts of the image, so sets of units assigned different parts of the image within a given layer may be assigned identical weights in at least some embodiments. Units in a given layer may be may be referred to as feature processing filter maps (or simply as filter maps), with the outputs from the filter maps being referred to as feature maps. Units in a filter map may perform similar operations on different parts or neighborhoods of the image. A convolution layer such as C1 or C2 may comprise several filter maps (e.g., filter processing feature maps or FPFMs C1-1, C1-2, C1-3 of convolution layer C1) with respective weight vectors, so that several different types of features may be extracted at the convolution layer. The receptive fields of nearby units may overlap, again mimicking the manner in which the receptive fields of biological neurons overlap.

Once a feature has been detected, its absolute position within the image being analyzed may become less important than the approximate relative position of that feature with respect to other detected features. For example, if a mouth is detected as a feature of a human face, its position relative to the nose and eyes may be more important than the exact location of the mouth within the image. In fact, keeping track of the precise positions of different visual features may actually be detrimental to recognizing higher-level objects, because the precise positions of the features may vary across different images. Pooling or sub-sampling layers (such as layers P1 and P2 in FIG. 2, each of which may include respective feature processing filter maps such as FPFMs P1-1, P2-1, etc.) may be used to reduce the precision with which the positions of various identified features are represented in the filter maps. For example, the average output of some number of neighboring units of the filter maps of the previous convolution layer (e.g., C1 in the case of P1) may be computed at the filter maps of the pooling layers. Successive layers of convolution and pooling layers may be alternated in the model, for example with the number of filter maps increasing in each layer and the spatial resolution decreasing in each layer. To produce the final output of the model one or more fully-connected layers such as F1 and F2 may be implemented, in which inputs from all the units of the previous layers are combined at each unit to derive the model predictions.

A number of different variants of a convolutional neural network model such as model 202 may be trained in parallel, e.g., using respective execution platforms of a machine learning service as training nodes for the variants. The variants may differ from one another in their structure (e.g., the number of internal layers, the number of filter maps per layer, etc.), and/or as the initial parameters such as weights and biases assigned to various subcomponents of the model. In the depicted variant, model 202 comprises two convolution layers C1 and C2, two pooling layers P1 and P2, and two fully connected layers F1 and F2; other variants may comprise different numbers and/or sequences of any of these types of layers. The convolution, pooling and fully-connected layers may also be referred to as hidden layers in that raw information about the operations being performed at these layers in various training iterations or test runs may not necessarily be provided to the clients on whose behalf the model is being generated, at least by default. In various embodiments, details regarding the filter maps, weights, biases, etc. at each layer may be written to respective local logs at the execution platforms where the model variants are being prepared. A visualization manager or similar tool may extract the information from log entries and generate easy-to-understand displays that allow clients to compare the relative quality of different model variants, analyze details of selected layers, detect whether a given variant is exhibiting unexpected behavior and take responsive actions, and so on. In some cases as discussed below, the visualization tool itself may generate recommendations and/or warnings about the states of one or more model variants.

Example Data Collected for Visualization

Figure 3:
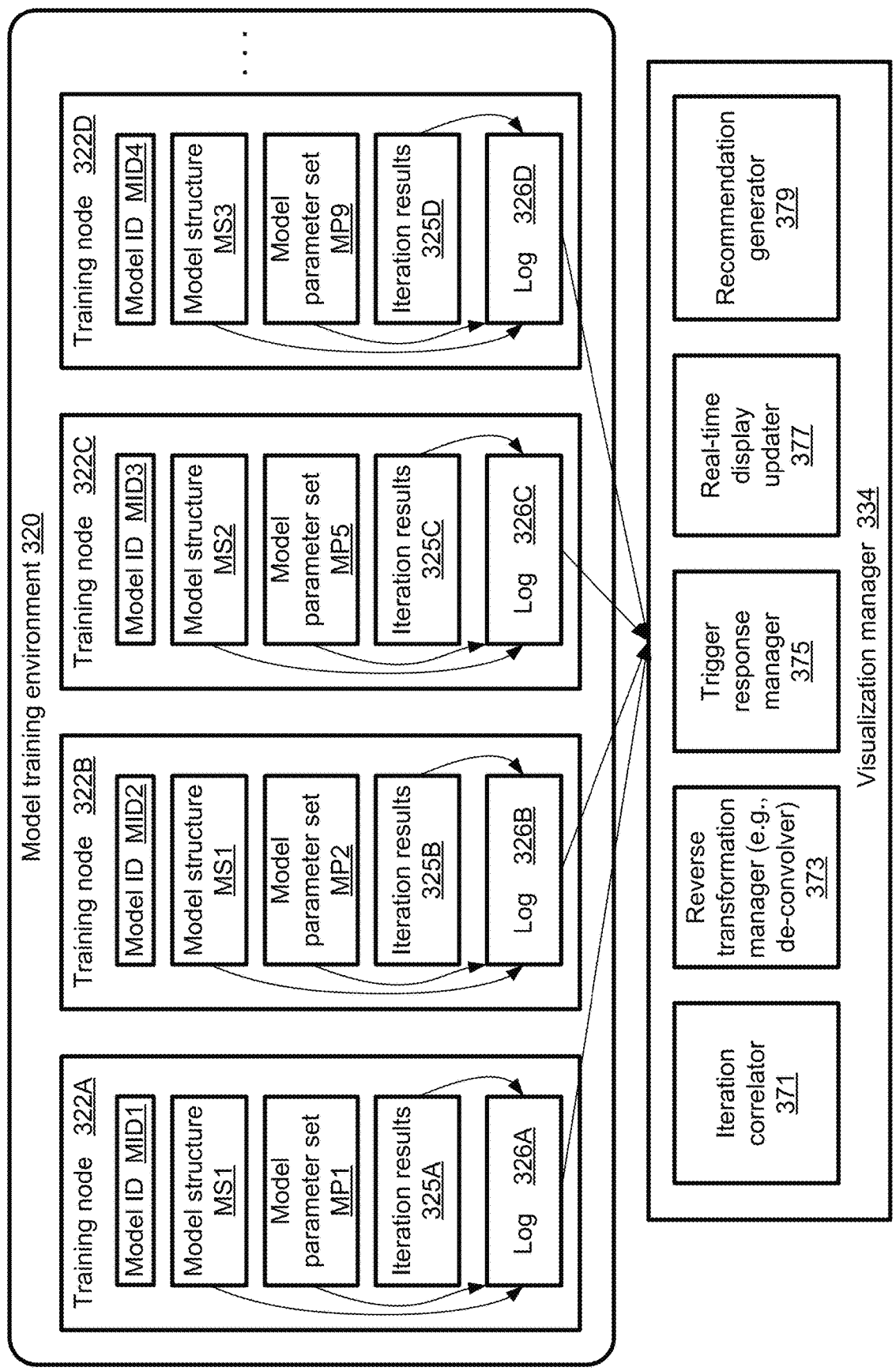
FIG. 3 illustrates examples of the kinds of data which may be collected from model training node logs by a visualization tool, according to at least some embodiments.

FIG. 3 illustrates examples of the kinds of data which may be collected from model training node logs by a visualization tool, according to at least some embodiments. As shown, model training environment 320 may comprise a plurality of training nodes 322, such as training nodes 322A-322D. Each training node 322, which may for example comprise portions of one or more execution platforms of a machine learning service, may be deployed to train and/or test one or more variants of a machine learning model. In the depicted scenario, model variants with respective identifiers MID1, MID2, MID3 and MID4 are being trained at nodes 322A-322D. The variants may differ from each other in their structures (indicated via labels MS1, MS2, etc.) and/or their parameter sets (indicated via labels MP1, MP2, etc.). In at least some embodiments, a common input data set may be used to train and/or test several or all the model variants.

At each of the training nodes 322 of FIG. 3, entries containing metadata for various iterations of the model variant being trained may be stored in a respective local log 326. The logs 326 (e.g., logs 326A-326D at nodes 322A-322D respectively) may contain information about the structure of the model, values of various parameters such as initial and iteration-level weights, gradients, biases, etc., as well as the results of each iteration. Some log entries may be added just once per model variant—for example, a log entry indicating the structure MS1 of the model with identifier MID1 may be entered once into log 326A, and/or an initial set of weights may be included in a log entry corresponding to parameter set PS1 of model MID1. Other log entries may be added per iteration—e.g., the values of the loss function may be added to the log for each iteration in the form of iteration results 325A-325D. In some cases, multiple log entries may be added during a given training iteration or test run—e.g., respective descriptors of the current filter maps may be stored in the log for each plane of several layers of a convolutional neural network model.

Some of the model variants being developed concurrently may have the same structure but different parameters in at least some embodiments. While others may differ in both structure and parameters. For example, models with identifiers MID1 and MID2 are both shown as having structure MS1, while MID3 and MID4 have structures MS2 and MS3 respectively. In various embodiments, a large number of model variants may be trained/tested in parallel using multiple training iterations, and each model variant may have a large number of parameters at each layer in each iteration. Consequently, at least for some complex models and data sets, the information collected in the logs 326 of the training environment 320 may in aggregate comprise millions of items.

The visualization manager 334 may be configured to collect log entries from the different training nodes 322, process the metadata indicated in the entries, and provide easy-to-understand visualizations of the data in the depicted embodiment. The visualization manager 324 may comprise a number of subcomponents, such as an iteration correlator 371, a reverse transformation manager 373, a trigger response manager 375, a real-time display updater 377 and a recommendations generator 379.

Information about matching iterations of different models may be combined at the iteration correlator 371. For example, it may be the case that with respect to the two model variants with respective identifiers MID1 and MID2, the kth training iteration of MID completes at time T1, while the kth training iteration of MID2 completes some time later at time (T1+delta1). The iteration completion times may differ, for example, because of differences in the resources available at nodes 322A and 322B, or because the parameter differences between the two model variants result in requirements of different amounts of computation. The iteration correlator 371 may be responsible for providing fair iteration-level comparisons—e.g., so that the loss function value of MID1's kth iteration is compared to the loss function value of MID2's kth iteration, and so on.

The entries in logs 326 may comprise text and/or numeric transformations of feature processing filters and other visual model components and outputs in some embodiments, which may be re-transformed back into visual images (e.g., collections of pixels) by reverse transformation manager 373 in the depicted embodiment. In some embodiments, the visualization manager may be responsible for taking actions (e.g., displaying warnings or alerts visually using flags or other symbols) in the event that a given metric associated with a model meets a triggering criterion. Such trigger-based operations may be tracked or orchestrated by the trigger response manager 375. In some embodiments the visualization tool may comprise a recommendation generator 379 which may provide guidance to a client via the visualization information regarding parameter value selection, abandoning a given model variant, and/or other actions. The real-time display updater 377 may be responsible for efficiently generating the visual layout of the information to be provided to the client regarding the various model variants as new information becomes available, responding to input received from the clients via various types of controls (such as mouse clicks, drop-down menus and the like) to zoom in and out of various subsets of the data, and so on. In various embodiments the visualization manager or tool used to provide insights into the complex machine learning models being trained/tested may include subcomponents other than those shown in FIG. 3, or may not include some of the depicted subcomponents. In one embodiment, for example, the visualization tool may not generate recommendations for a client, so the recommendations generator subcomponent may not be required.

Visualization Tool Output Examples

Figure 4:
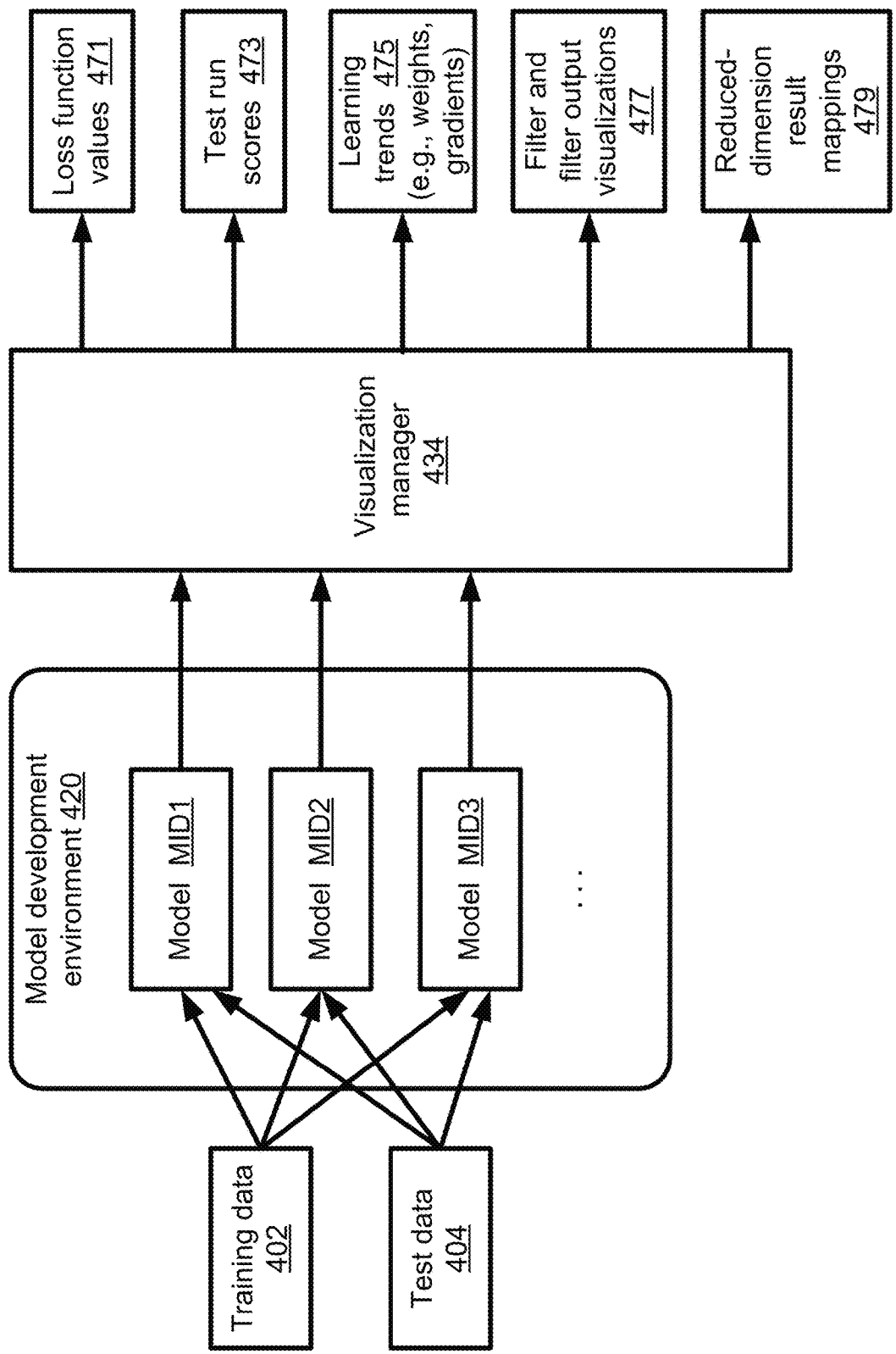
FIG. 4 illustrates example categories of machine learning metrics which may be displayed by a visualization tool, according to at least some embodiments.

FIG. 4 illustrates example categories of machine learning metrics which may be displayed by a visualization tool, according to at least some embodiments. In the depicted embodiment, a training data set 402 and a corresponding test data set 404 are being used to develop several different model variants such as MID1, MID2, and MID3 at a model development environment 420. A single input data set (e.g., a corpus of thousands of photographs in the case of an object recognition use case) may be divided into one subset (training data 402) used to train the models and another subset (test data 404) used to evaluate the accuracy of the models' predictions, for example. The models MID1, MID2, MID3 etc. may all use the same high-level algorithm in the depicted embodiment (e.g., a convolutional neural network algorithm may be used).

The visualization manager 434 may obtain metadata pertaining to the different model variants, e.g., by extracting various log entries generated at the execution nodes where the models are being trained/tested. A number of different types of output may be displayed by the visualization manager using the collected data, e.g., to facilitate tuning and debugging of the models, to provide feedback regarding the progress being made as more iterations of training followed by testing are performed, and so on.

For at least some models, respective values of loss functions may be computed for every iteration (or at least a subset of iterations), with the overall goal of the model training being to converge on some minimum loss function value. The loss function values 471 corresponding to various training iterations of different model variants may be displayed by the visualization manager. In some embodiments, at least some training iterations may be followed by corresponding test runs, in which the accuracy of the model's predictions or results on observations which have not been used for training may be obtained. The result of a given test run, indicative of the quality of the model being tested, may be termed a test score. Respective test scores 473 of different model variants and different test runs may be displayed by the visualization manager in the depicted embodiment. Learning trends 475 over multiple iterations (e.g., the values of various weights, biases, gradients, learning rates, etc.) may be displayed in some embodiments. Visualizations of various filters and filter outputs 477 (which may for example require reverse transformations from the text/numeric representations of the filters stored in the log entries back into pixel-based representations) may also be provided to clients in the depicted embodiment.

In some embodiments in which classification models are being trained/tested, the relative extent to which different model variants are able to identify clear distinctions or boundaries between different output classes may be a significant factor in evaluating the variants. In many cases, at least some of the outputs or predictions produced by a given model may be expressed as a vector or matrix of high dimensionality. Such high-dimensional output from different variants may be mapped to two dimensions or three dimensions and displayed to the client by the visualization manager in the depicted embodiment. Such reduced-dimension result mappings 479 may, for example, make it easy for a client to tell the extent to which the predicted classes overlap with one another for a given model variant.

Additional details regarding the manner in which various metrics of the kind indicated in FIG. 4 may be displayed in various embodiments are provided below. It is noted that the set of metric categories shown in FIG. 4 is not intended to be exhaustive; metrics other than those shown in FIG. 4 may be provided to clients in various embodiments. Some metrics may be shown by default, while others may be displayed in response to specific programmatic requests from the client.

Many iterative machine learning algorithms, including neural network algorithms, may employ a version of a gradient descent algorithm in which the goal of successive training iterations is to eventually converge upon a minimum in the value of a loss function or an objective function. As such, the value of the loss function may be computed for every training iteration. In general, as more iterations are performed on a given model variant, a gradual downward trend in the loss function values may be expected, although there may be occasional increases in the loss function from one iteration to the next. However, a persistent set of increases in the loss function values from one iteration to the next may indicate a problem (e.g., a bad choice of initial parameters, or a bug in the algorithm code for the particular combination of parameters and model structure chosen) with respect to a model variant. Furthermore, comparing the loss functions at equivalent training stages (e.g., after K iterations) for different model variants may provide clients with one way to rank the model variants—e.g., if one particular model variant MV1 consistently results in a lower loss function value for the same iteration count than other model variant MV2, this may be one factor (among others) to consider MV1 superior to MV2. A visualization manager or a similar tool may provide dynamically updated displays of loss function values for multiple model variants whose training is underway in some embodiments.

Figure 5:
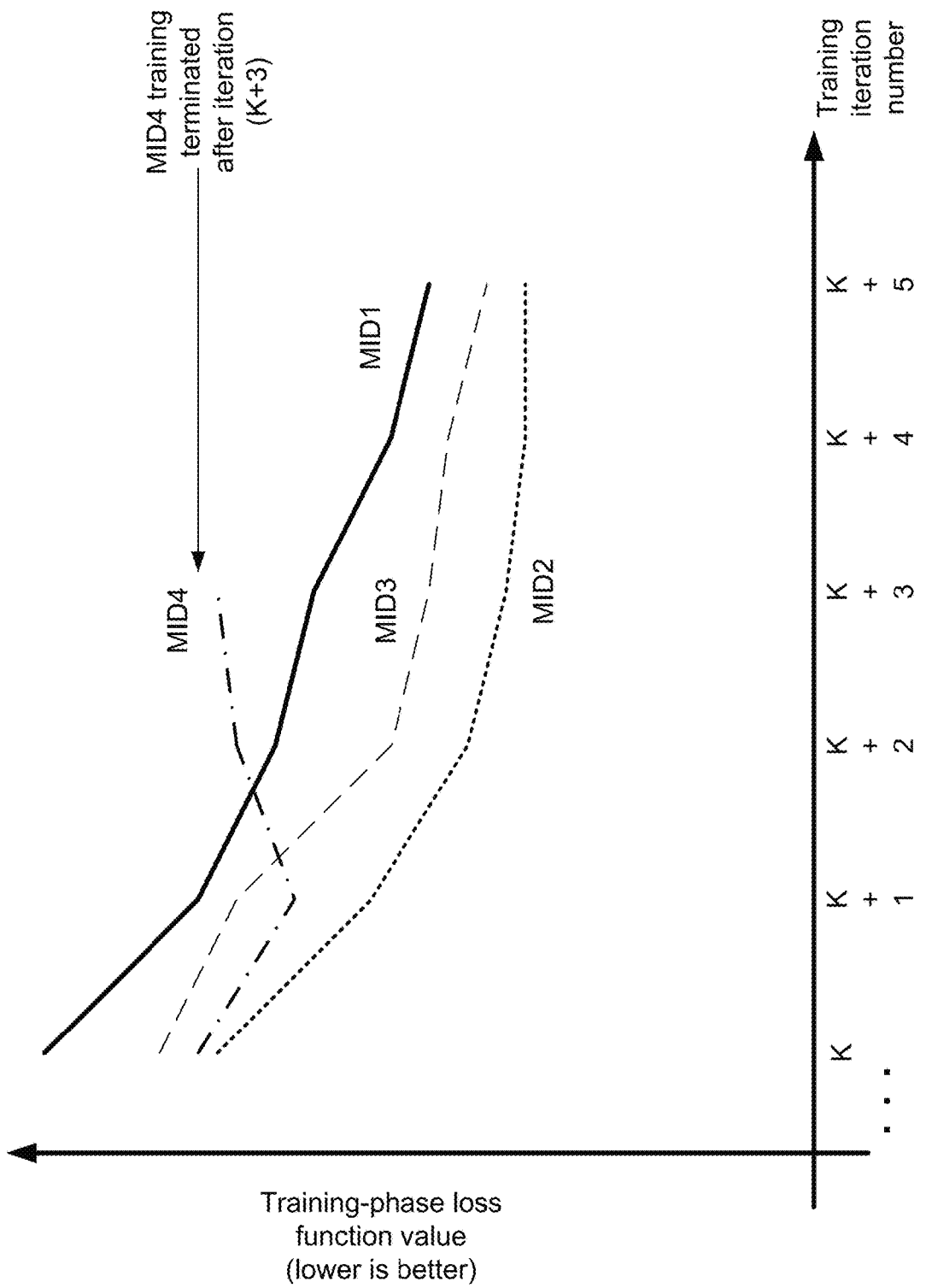
FIG. 5 illustrates an example loss function graph which may be displayed by a visualization tool for training iterations of a machine learning model, according to at least some embodiments.

FIG. 5 illustrates an example loss function graph which may be displayed by a visualization tool for training iterations of a machine learning model, according to at least some embodiments. In the approach illustrated in FIG. 5, points along the X-axis of the graph correspond to successive training iterations (e.g., iteration K, (K+1), (K+2) etc.), while points on the Y-axis correspond to loss function values. The loss function curves for four different model variants, identified by the labels MID1, MID2, MID3 and MID4 respectively, are shown. The trends in the behavior of the model variants MID1, MID2 and MID3 with respect to the loss function is broadly as expected—the loss function value generally decreases as more training iterations are performed. However, MID4 shows unusual behavior, in that the loss function value increases from iteration (K+1) to iteration (K+2), and then again increases from iteration (K+2) to iteration (K+3). A data scientist or other client viewing the graph shown in FIG. 5 may conclude that the training of model variant MID4 is not proceeding as expected, and may consequently terminate the training of MID4 after iteration (K+3). As a result, the resources of the execution platform which were previously dedicated to training MID4 may be freed up for other model variants. The details indicated in log entries generated for MID4 (especially with respect to iterations K, (K+1), (K+2), and (K+3)) and similar model variants may be examined to debug the problem, and the training of a new model variant with a different set of initial parameters or a different structure may be begun using the resources previously reserved for MID4. If the visualization tool had not provided the results of successive iterations as soon as (or shortly after) they are computed, numerous iterations of MID4 training may have been performed after iteration (K+3), potentially wasting a large amount of computing resources.

As mentioned earlier, in at least some embodiments machine learning models may be tested several times as they are being trained, using test data sets that are distinct from the training data sets used to develop the models. Any of a number of different accuracy-related quality metrics may be generated in each test run—for example, in the case of an object recognition exercise, the fraction of correctly-identified objects among the test data images may be considered one score of the model quality. Test runs may be interspersed with training iterations—e.g., after every N iterations of training (where N may be as small as 1), a test run may be performed and a model quality score may be computed. In some implementations, depending on the kind of model being used, multiple quality metrics may be aggregated into a single score value (e.g., by computing a mean value of multiple individual metrics). In contrast to the loss function trends expected for training iterations, the test run scores may generally be expected to increase over successive test runs.

Figure 6:
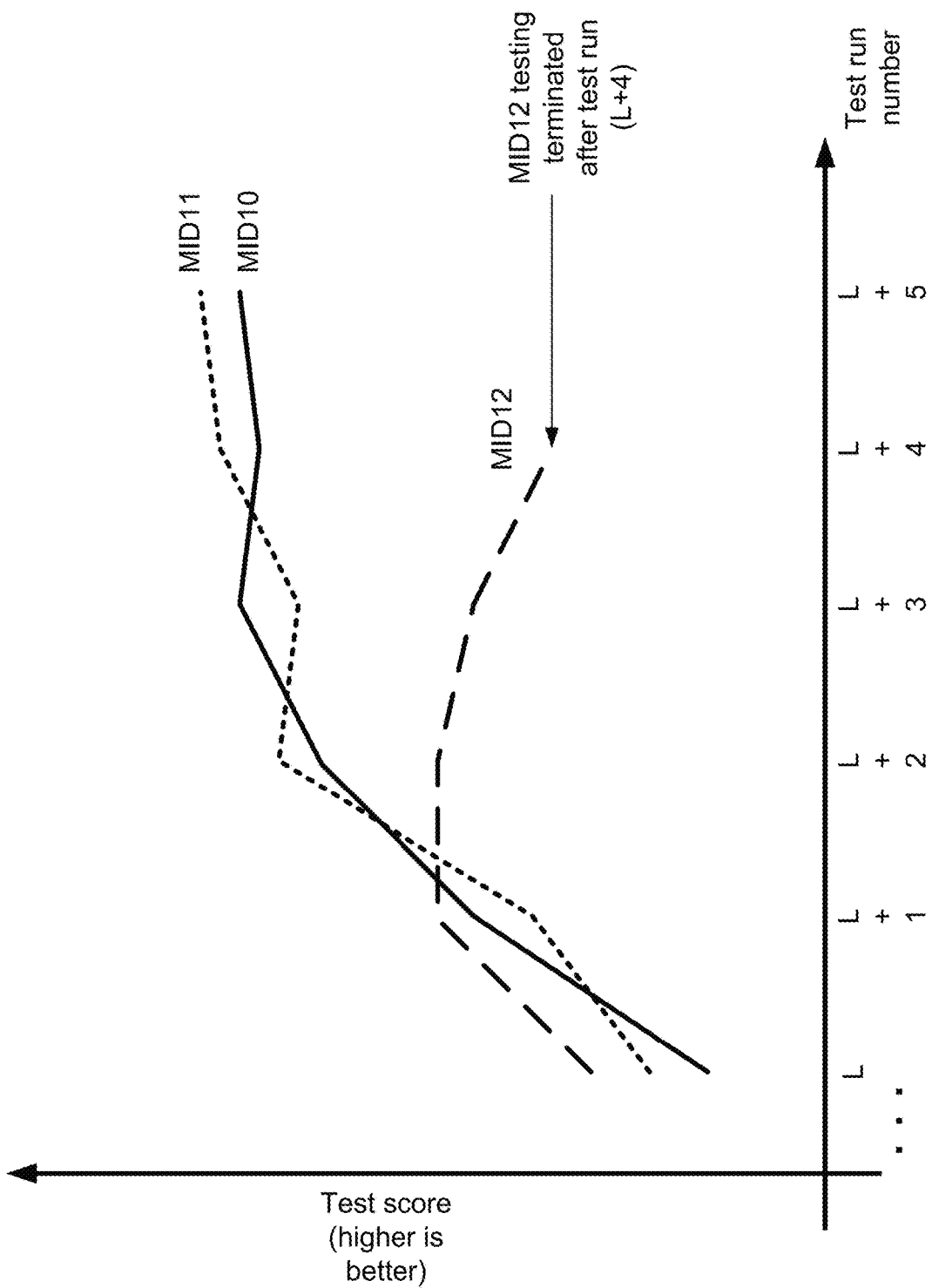
FIG. 6 illustrates an example test run score graph which may be displayed by a visualization tool for test runs of a machine learning model, according to at least some embodiments.

FIG. 6 illustrates an example test run score graph which may be displayed by a visualization tool for test runs of a machine learning model, according to at least some embodiments. As mentioned earlier, a given test run may involve a single feed-forward processing pass through the model, and may be performed after some number of training iterations have been completed. As such, the number of training iterations that have been completed at the time that a given test run is performed may be considered a logical timestamp for that test run. In the embodiment depicted in FIG. 6, successive test runs are assigned respective test run numbers (which may in turn have been derived from logical timestamps corresponding to training iterations). Test run numbers increase from left to right along the X axis, while the test run scores increase from the bottom to the top along the Y axis. Test scores corresponding to test runs labeled L, (L+1), etc. are shown for three model variants—MID10, MID11 and MID12. The test scores for MID10 and MID11 are generally as expected, with a gradual and slowing increase in accuracy. However, the behavior of MID12 is problematic—test scores flatten out between runs (L+1) and (L+2) and fall for two successive runs thereafter. As a result, the testing (and further training) of MID12 may be terminated after run (L+4) in the depicted scenario, and the resources that were used for MID12 may be freed and/or re-assigned to other model variants.

Generally speaking, it may be helpful to examine both the loss function trends and the test score trends while the iterative training and testing of a group of model variants is still underway. For example, the loss function results of a given model variant by themselves may appear to match expectations, but unexpected trends in the test scores for that variant may indicate that "overfitting" may be occurring—e.g., the model variant may be being trained too well for the specific observations comprising the training data, and may not be generalizable to data that has not been used for training.

It is noted that the X-axis of the kinds of graphs shown in FIG. 5 and FIG. 6 may in some embodiments be expressed in units of time (or accumulated resource usage such as the number of CPU-seconds consumed) rather than in units of iterations or test run numbers. In one embodiment, a client of the visualization tool may be able to choose whether time, resource usage or iteration/run counts are to be used for the X-axis units. In general, while more repetitions (of either training or testing) may of course imply greater elapsed time, the time taken for the kth training iteration (or lth test run) of one model variant may differ from the time taken for the kth training iteration (or lth test run) of a different model variant. Some clients may wish to compare model quality metrics visually on an iteration-to-iteration or run-to-run level, while other clients may wish to also compare the amounts of time or resources being consumed for respective iterations.

Figure 7:
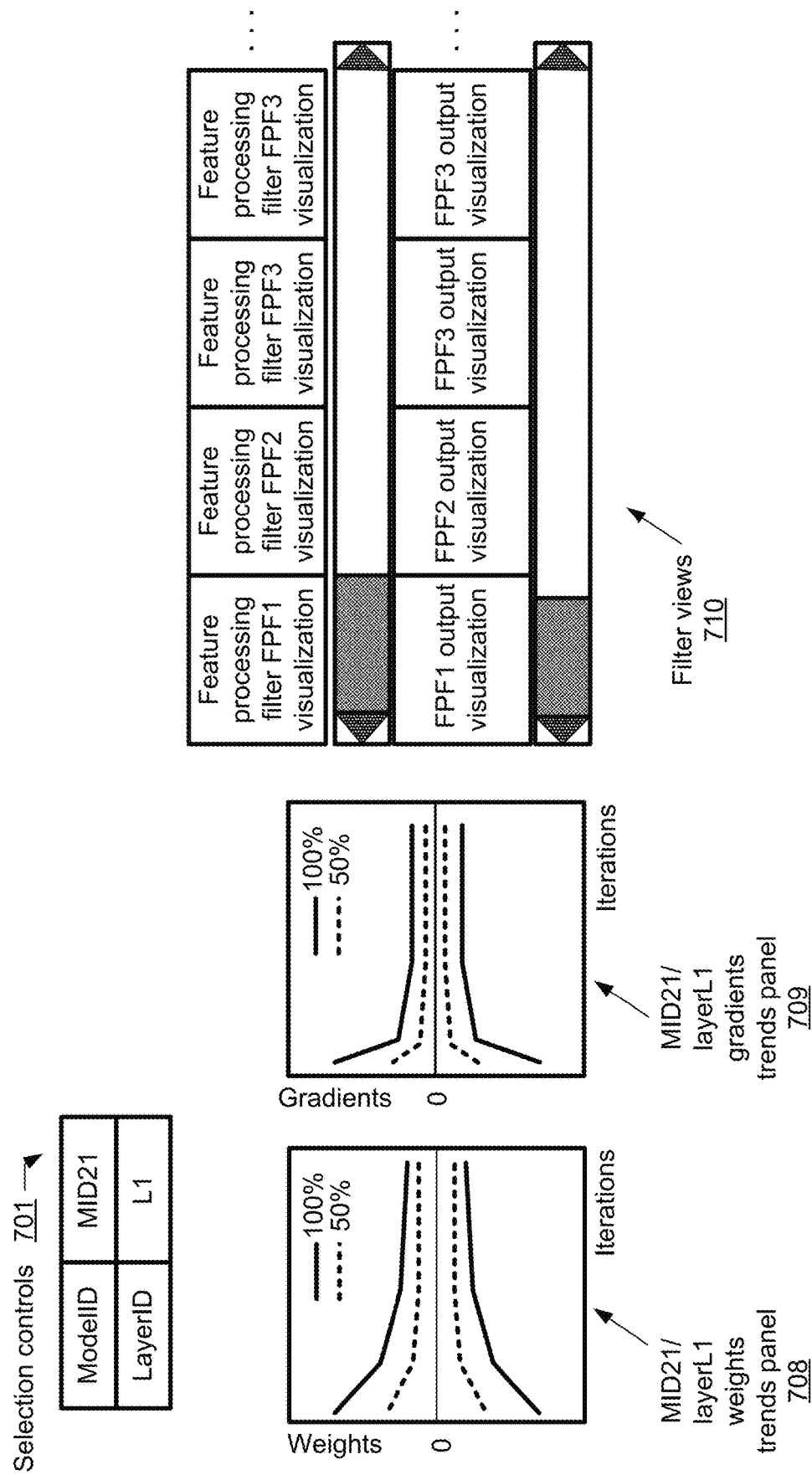
FIG. 7 illustrates examples of layer-specific information which may be provided by a visualization tool for internal layers of a machine learning model, according to at least some embodiments.

Many machine learning models may comprise numerous internal layers whose operations and behavior may be hidden, at least by default. A visualization tool may be able to expose details of such hidden layers, leading for example to a clearer understanding of the contributions of the different layers, early detection of unexpected model behaviors faster debugging and parameter adjustments. FIG. 7 illustrates examples of layer-specific information which may be provided by a visualization tool for internal layers of a machine learning model, according to at least some embodiments. In the depicted embodiment, the visualization tool's programmatic interface includes selection controls 701 allowing a client to specify an internal layer of a particular model variant for which detailed information is to be displayed. Using the selection controls 701, a client has indicated that information specific to layer L 1 of the model variant with model identifier MID21, a convolutional neural network model being used for object recognition, is to be displayed.

In the depicted example scenario, panel 708 generated by the visualization tool shows the trends, over several successive training iterations, of weights used for layer L1, while panel 709 shows the corresponding trends in gradients. In the depicted embodiment, respective curves are shown for different percentiles of the weights and gradients, as indicate by the label 100% (for the $100^{th}$ percentile or maximum values) and 50% (for the $50^{th}$ percentile or median values) in panels 708 and 709. In other embodiments, information about gradients and/or weights may not necessarily be broken down by percentile. In FIG. 7, filter views region 710 of the tools' interface comprises representations of a set of feature processing filters (FPF1, FPF2, etc.) corresponding to the different subcomponents or planes of layer L1, as well as the outputs of the filters. The log entries obtained from the training nodes at which model variant MID21 is being trained may comprise text or numerical representations corresponding to the feature processing filters and their outputs for various training iterations, and the visualization tool may perform reverse transformations on the text or numerical representations to present the filters and their outputs in visual form in the depicted embodiment. In at least some embodiments, interactive controls allowing clients to view the changes in the feature processing filters as additional training iterations are run, and the changes in the corresponding outputs, may also be provided by the visualization tool. For example, a "replay iterations" interface may allow a client to scroll through filter and/or filter output visualizations for iterations J, (J+1), (J+2) in sequence, providing insights into the improvements (or lack of improvements) in the filters during the selected set of iterations. In scenarios in which model variants do not appear to be making progress in the expected directions, viewing the details of internal layers may enable clients to quickly determine where modifications to the model structures or parameters should be made, or the particular modules in the model algorithm code which may need to be examined/debugged to resolve the problems.

Figure 8:
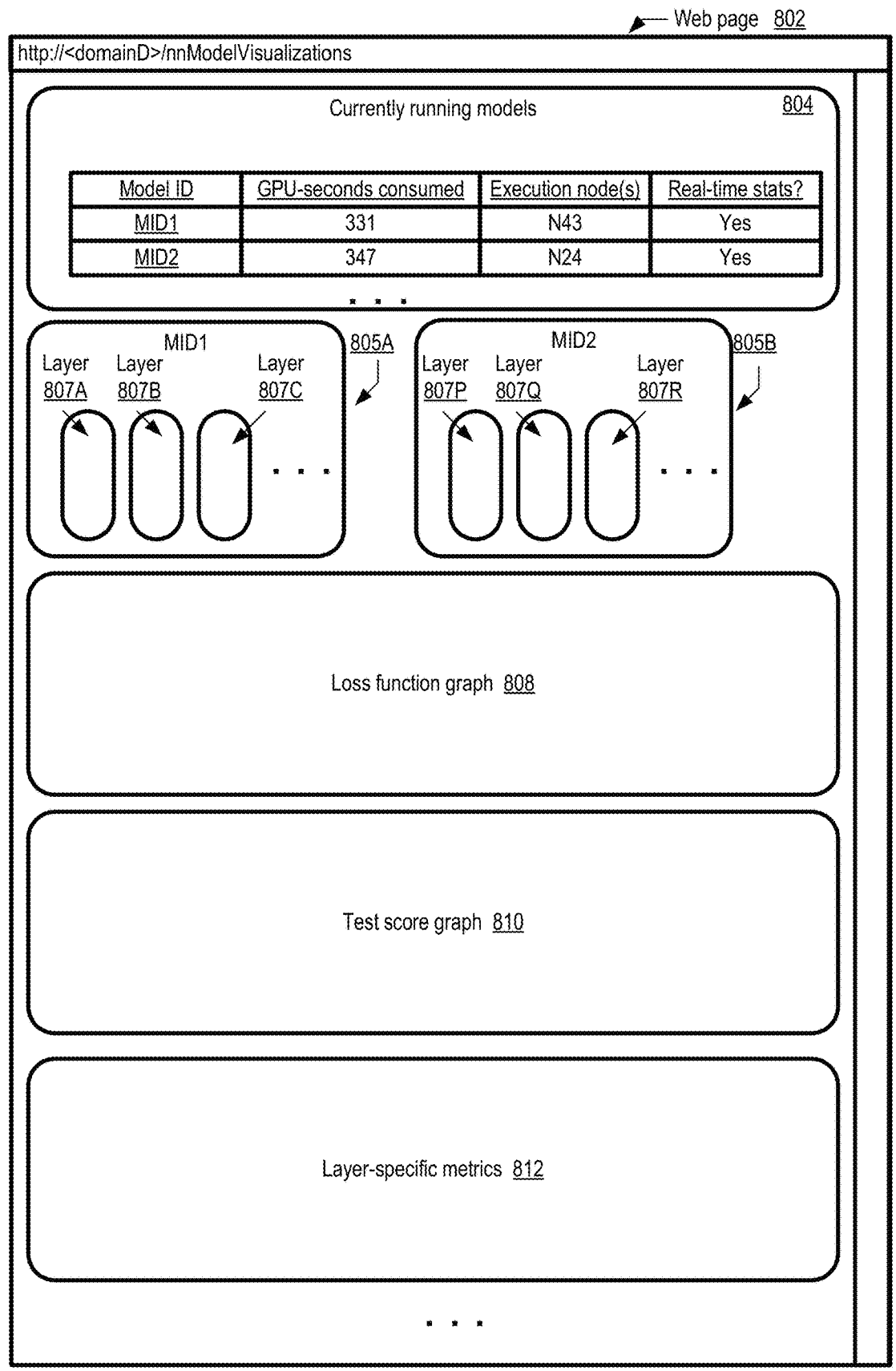
FIG. 8 illustrates an example layout of a web-based programmatic interface of a machine learning visualization tool, according to at least some embodiments.

A single display may be used in some embodiments to provide information regarding various aspects of training and testing of the model variants. FIG. 8 illustrates an example layout of a web-based programmatic interface of a machine learning visualization tool, according to at least some embodiments. The interface may comprise web page 802, subdivided into several regions in the depicted embodiment for showing different properties of a group of models being generated concurrently. Web page region 804 lists the respective identifiers of the different model variants (e.g., MID1, MID2, etc.) for which metadata is being collected, e.g., in the form of local log entries generated at respective execution platforms. In the depicted embodiment, the execution platforms comprise graphical processing units or GPUs—that is, the computations for model training and testing are being performed using GPUs rather than conventional CPUs. Information identifying the specific execution platforms being used for the different models (e.g., N43 and N24 for models MID1 and MID2), and the cumulative amount of computational resources that have been used thus far (in the column labeled "GPU-seconds consumed") may also be displayed in region 804. In some embodiments the resources used for different iterations of various model variants may be indicated separately—e.g., respective resource usage metrics may be provided for iterations I, I+1, I+2, etc. An indication as to whether the metrics being displayed in web page 802 are updated in real time is provided in the column labeled "real-time stats" in region 804. In at least some embodiments, a client may be permitted to enable or disable real-time displays for various models. For example, if hundreds of different model variants are being trained, a client may wish to view results of a selected subset of the variants in real time, and may therefore be allowed to turn off or disable/enable real-time collection and display of model metadata for at least some of the variants via the visualization interface.

In regions 805A and 805B, representations of the respective structures (e.g., the number of layers and the number of subcomponents per layer) of model variants MID1 and MID2 are provided in the depicted embodiment. Clients may click on the model identifiers shown in region 804 to view the structures of different model variants. Loss function graph 808 may indicate loss function values over some number of recent training iterations, while test score graph 810 may display the results of some number of recent test runs. Clients wishing to view the details of parameters such as weights, gradients, biases, etc., of specific layers of different model variants may click on the layers (e.g. layers 807A-C or 807P-R) in the structure views 805, and the corresponding details may be displayed in layer-specific metrics region 812 in the depicted embodiment. Different regions of the web page may be refreshed dynamically with the latest data as it becomes available. In at least some embodiments, clients may rearrange the regions on the web page 802—e.g., more layer-specific details regions may be added, test or training results may be moved within the page or removed, and so on. In some embodiments, interfaces which are not necessarily web page-based may be used—e.g., a graphical user interface which does not rely on HTTP (HyperText Transfer Protocol) may be employed. In some embodiments, the data underlying the graphical displays or visualizations may be exportable in text format—e.g., a client may be able to download comma-separated-values (CSV) or XML (extended markup language) versions of the displays for offline viewing of the model information.

In many cases, a given machine learning model may perform classification or prediction at multiple levels of abstraction. For example, animals depicted in an image data set may be classified at a high level into "cats" and "dogs"; within those classes the individual instances of the identified animals may differ from one another in numerous characteristics (e.g., size, colors of coat, pattern of coat, hair length, relative length of the legs with respect to the body, etc.). To represent these characteristics, the output produced by some machine learning models may be expressed in vectors of high dimensionality—for example, several dozen output variables may be used to represent the various characteristics of a cat or a dog in the above animal classification example. The variants of a model may differ from one another in the extent to which they can distinguish between sub-groups (such as cats versus dogs) of output classes. In some cases a model variant that is able to draw a more clear distinction between different sub-groups may be preferred to one whose output classes overlap significantly with one another; for example, because extensive overlaps may lead to misclassifications more often. To show the extent to which different model variants can distinguish between sub-groups of output prediction classes, a low-dimensional mapping may be generated from the high-dimensional output produced by the different variants and displayed to clients in some embodiments.

Figure 9:
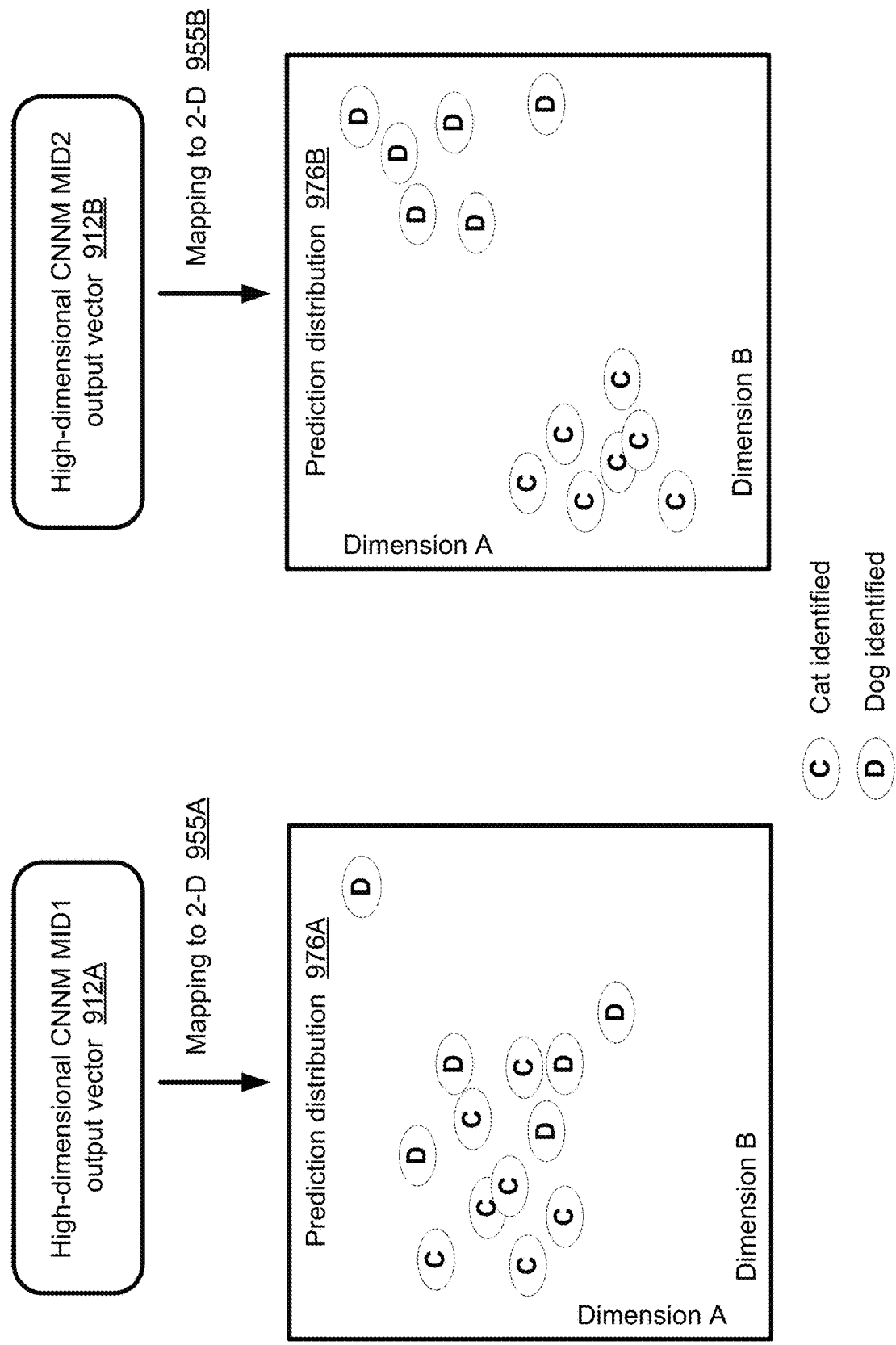
FIG. 9 illustrates example low-dimensional mappings of machine learning model outputs which may be provided by a visualization tool, according to at least some embodiments.

FIG. 9 illustrates example low-dimensional mappings of machine learning model outputs which may be provided by a visualization tool, according to at least some embodiments. The outputs produced by two variants of a convolutional neural network model, MID1 and MID2, may comprise respective high-dimensional vectors 912A and 912B in the depicted embodiment. The models may be used to classify images of animals into cats or dogs. Mappings 955A and 955B from the high-dimensional vectors to two dimensions A and B may be generated in the depicted embodiment. The mapping result dimensions A and B may not necessarily correspond to an easy-to-interpret physical characteristic of the identified objects—instead, they may represent artificial or abstracted properties of the results of the high-to-low-dimension mapping functions applied to the model output vectors.

The respective distributions of the predictions 976A and 976B in the two dimensions may be displayed in respective regions of the virtualization tool's output in some embodiments. Elements containing the letter "C" in FIG. 9 represent correctly-identified cats, while elements containing the letter "D" represent correctly-identified dogs. In some embodiments, the incorrect predictions may also be displayed in two dimensions—e.g., symbols C and C' respectively may be used for cats identified correctly and incorrectly, and D and D' respectively for dogs identified correctly and incorrectly. As is apparent from FIG. 9, in model MID1's output, when expressed in terms of the dimensions A and B, there is more of an overlap between the cat and dog predictions than in model MID2's output. Thus, the reduced-dimension mappings appear to indicate that MID2 is able to draw a more clear distinction or boundary between dogs and cats than model MID1. For applications in which such clear distinctions are preferred, model MID2 may be considered superior to model MID1, and the visualizations of the output may help clients rank the different models relative to one another. In some embodiments, three-dimensional or one-dimensional mappings of the high-dimensional output of various models may be displayed, e.g., rather than the two-dimensional mappings shown in FIG. 9. In at least one embodiment a client may indicate the number of dimensions to which the output should be mapped for display. In various embodiments such reduced-dimension mappings may be produced and displayed at various points during or after training a model—e.g., respective mappings may be generated after each training iteration (or test run) or after selected training iterations (or test runs).

Trigger-Driven Operations

Figure 10:
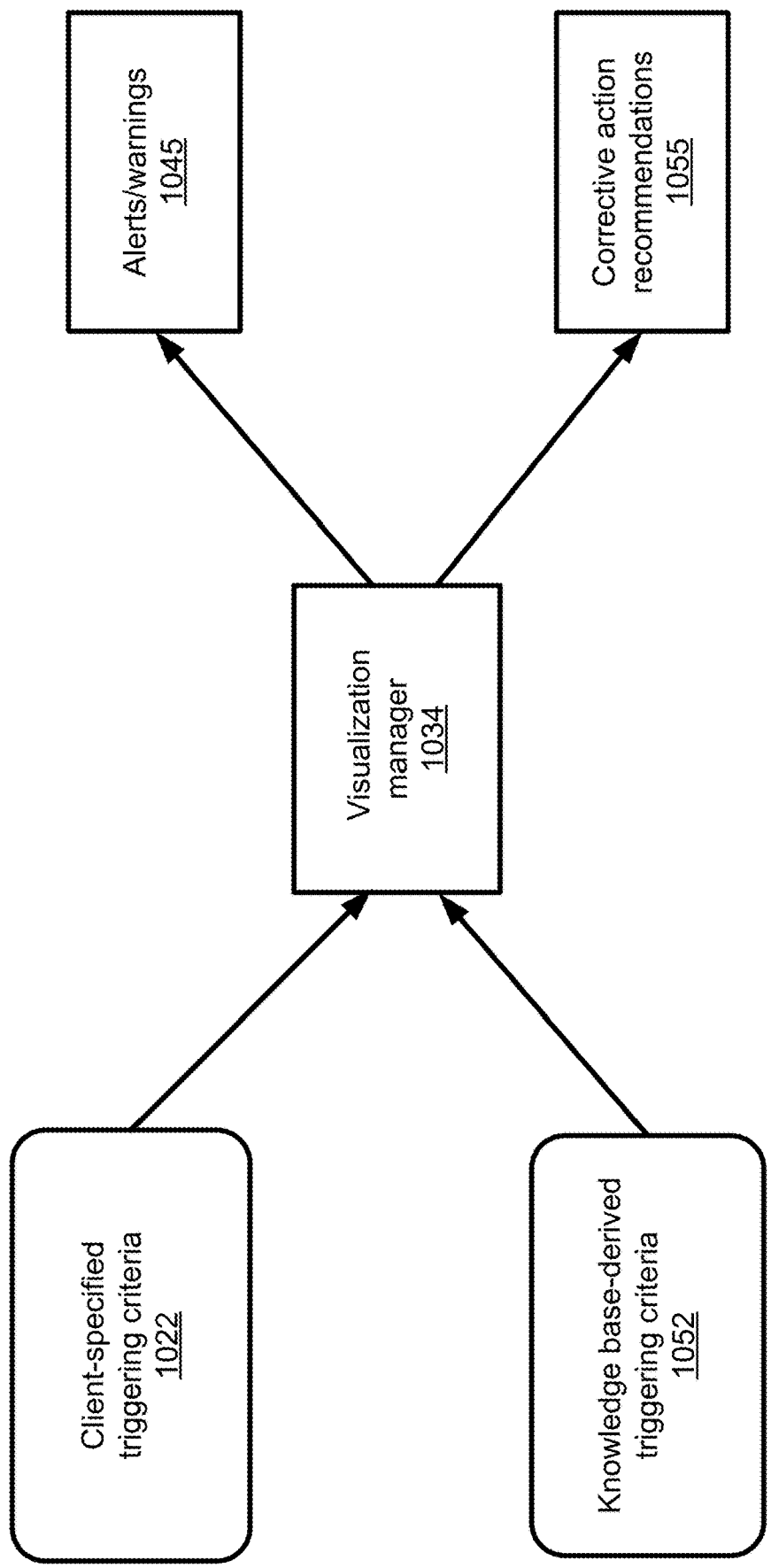
FIG. 10 illustrates examples of categories of notifications which may be generated by a visualization manager for a machine learning model, according to at least some embodiments.

In some embodiments, the visualization manager may analyze the metadata it collects regarding the training and testing of model variants and, in addition to displaying model metrics as discussed above, provide guidance to clients regarding possible changes which may be helpful in increasing the efficiency with which the modeling objectives can be met. FIG. 10 illustrates examples of categories of notifications which may be generated by a visualization manager for a machine learning model, according to at least some embodiments. In the depicted embodiment, at least two types of settings which are to trigger responsive actions may be obtained at the visualization manager. Using the programmatic interfaces of the visualization manager 1034 and/or other components of a model generation environment, clients may provide one set of triggering criteria 1022 regarding selected metrics and the specific actions to be taken if the triggering criteria are met. The visualization manager may also have access to another set of triggering criteria 1052 derived, for example, from a knowledge base similar to knowledge base 138 of FIG. 1. Examples of such triggering criteria may include, among others, the maximum number of successive iterations with increasing loss function values which are acceptable, the maximum acceptable iteration-to-iteration deltas in loss function values or test scores, and so on.

As the visualization manager 1034 collects and processes metadata from the execution platforms where different model variants are being trained and/or tested, it may determine whether any of the triggering criteria 1022 or 1052 have been met. The visualization manager may provide visual alerts/warnings 1045 in the depicted embodiment regarding the particular model variants and/or iterations at which the triggering conditions were met. In at least some embodiments, the visualization manager 1034 may generate corrective action recommendations 1055 for certain kinds of problem states—e.g., recommendations to change model parameters, use a different execution platform, and the like may be provided. It is noted that in large model generation environments, only a subset of the available information regarding all the models may be displayed at any given point of time, e.g., due to the limitations in the size of the display interface. Especially in such environments, it may be helpful for the visualization tool to apply triggering criteria 1032 or 1052 to all the data collected, and not just to the subset of data which happens to be displayed at any given time. As a result of such analysis, problematic model variants may be identified even if the information about the problematic variants is not being presented to clients at the time that the triggering conditions are met.

Methods for Visualization of Machine Learning Model Information

Figure 11:
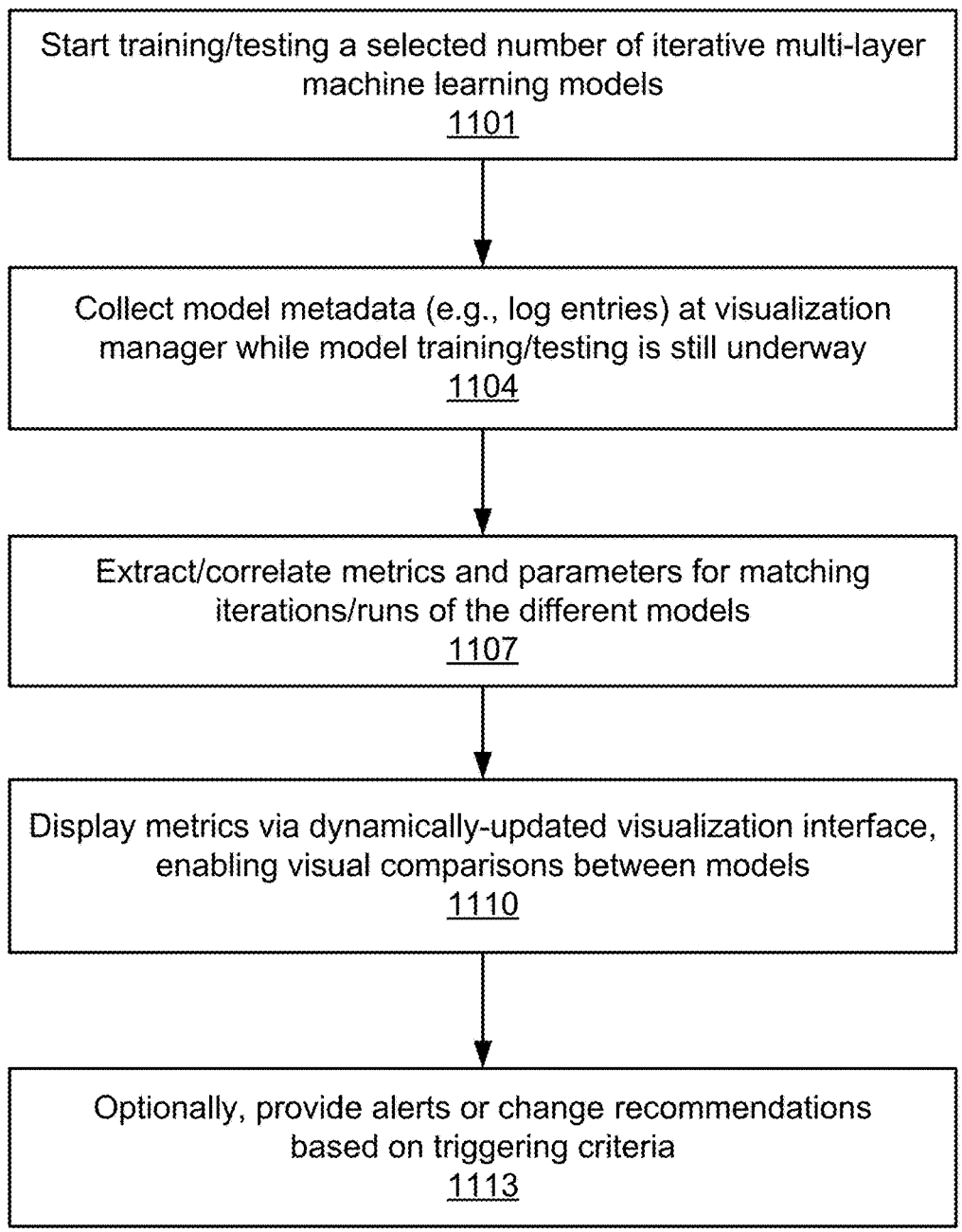
FIG. 11 is a flow diagram illustrating aspects of operations of a machine learning environment which comprises a visualization component for complex multi-layer models, according to at least some embodiments.

FIG. 11 is a flow diagram illustrating aspects of operations of a machine learning environment which comprises a visualization component for complex multi-layer models, according to at least some embodiments. As shown in element 1101, the training and/or testing of one or more iterative multi-layer machine learning models at respective execution platforms may be begun, for example in response to a request received from a client of a machine learning service. For example, in some embodiments, convolutional or other similar neural network algorithms involving numerous internal model layers may be used to solve computationally-intensive problems such as object recognition. Iterative techniques such as various types of gradient descent-based algorithms may be may be used to train the model variants in various embodiments. Multiple model variants, which may for example differ from one another in structure (e.g., the number of layers and the kinds of operations performed at each layer) and/or in parameters (e.g., weights, biases, learning rates etc.) may be trained at least partially in parallel in some embodiments, e.g., to shorten the overall time required to arrive at least one high-quality model. In some cases the time to achieve convergence for a given model variant may be quite long—e.g., several hours or days may be required, depending on the particular algorithm being employed, the model structure, the size of the data set, etc.

A visualization manager or tool, which may be implemented using one or more computing devices, may collect several kinds of metadata pertaining to the training and testing of the model variants in the depicted embodiment (element 1104) while the training process is still ongoing. In some embodiments, for example, each execution platform (e.g., a GPU-based or CPU-based compute engine) at which a model variant is being trained may generate a growing local collection of log entries which may contain metadata indicative of the current state of the variant, and the visualization tool may obtain such log entries from the execution platforms.

From the collected metadata, metrics indicative of the operations and state of corresponding training iterations and/or test runs of different model variants may be extracted at the visualization tool (element 1107). Such metrics may, for example, include loss function values for different training iterations, test scores for different test runs, weights, gradients and other parameters of various hidden layers, and so on. In at least some embodiments in which object recognition or other problem domains involving feature processing filters are being used, respective visual representations of the feature processing filters and their outputs may also be generated from the text-based log entries, e.g., using de-convolution or other reverse transformation techniques. In one embodiment low-dimension mappings of high-dimensional model outputs may be generated, indicating the extent to which the predicted classes of different model variants overlap with one another.

The metrics derived from the collected metadata may be displayed to clients via a dynamically updated visualization interface (element 1110), which may allow model comparisons to be made easily, details of internal layers to be examined, and so on. In some embodiments, the visualization tool may also generate and display warnings, alerts or recommendations (e.g., for model parameter changes, model structure changes and the like) based on triggering criteria (element 1113).

It is noted that in various embodiments, operations other than those illustrated in the flow diagram of FIG. 11 may be used to implement the machine learning model visualization techniques described above. Some of the operations shown may not be implemented in some embodiments or may be implemented in a different order, or in parallel rather than sequentially.

Use Cases

The techniques described above, of collecting metadata associated with complex machine learning models, including metadata about internal layers which are typically opaque to clients on behalf of whom the models are being developed, and providing corresponding visualizations may be useful in a number of scenarios. As machine learning techniques are applied to more and more problem domains (such as object recognition from still or video data sets, including for medical and other applications) and larger data sets, the sophistication of the models that have to be trained is increasing. Some modeling algorithms may take hours or even days to converge, depending on the structure of the models and the sizes and statistical properties of the input data. As such, it may be beneficial to train and test multiple model variants (differing from one another in structure or initial parameters) in parallel, since sequential model development may require unacceptable amounts of time. Unfortunately, with a large number of model variants being trained and tested concurrently, and with each model potentially comprising thousands of tunable parameters, the total amount of information which may have to be reviewed to compare and evaluate the quality of the models, or to debug problematic models, may become extremely large. A visualization tool that collects information from all the execution platforms being used for the different variants, and presents an easy-to-understand representation of metrics such as loss function values, test scores, and internal layer parameter values may help clients verify whether progress is being made towards convergence at desired rates, and debug or tune model variants which require attention in real time.

Illustrative Computer System

Figure 12:
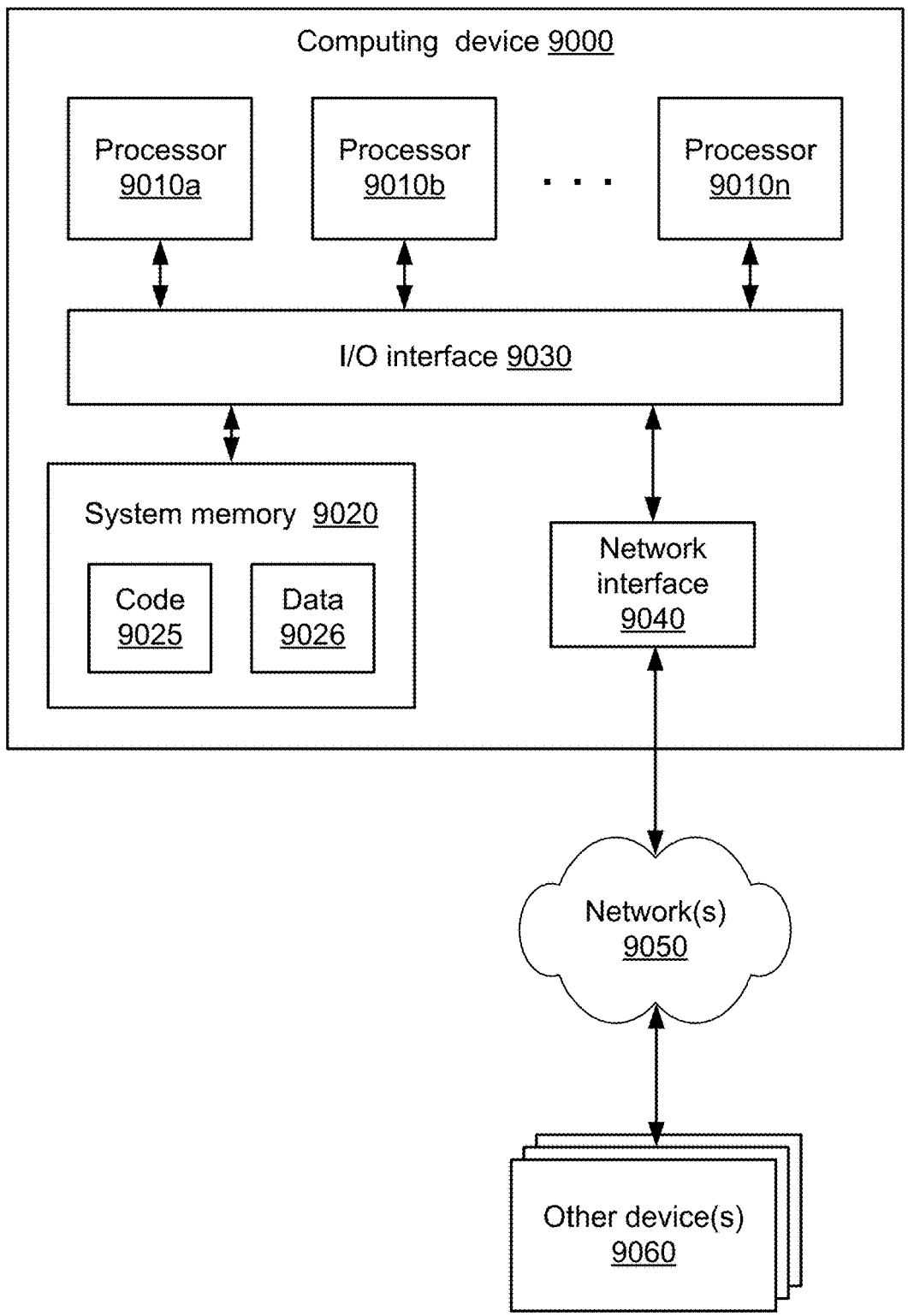
FIG. 12 is a block diagram illustrating an example computing device that may be used in at least some embodiments.

In at least some embodiments, a server that implements a portion or all of one or more of the technologies described herein, including the techniques to implement the visualization manager or other visualization tools, the model training and testing algorithms, and the like may include a general-purpose computer system that includes or is configured to access one or more computer-accessible media. FIG. 12 illustrates such a general-purpose computing device 9000. In the illustrated embodiment, computing device 9000 includes one or more processors 9010 (e.g. processors 9010*a-b* and 9010*n*) coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
obtaining, via an interactive interface, (a) a first visualization control request pertaining to a first machine learning model indicated by the interactive interface, and (b) a second visualization control request pertaining to a second machine learning model indicated by the interactive interface;
executing, at a first node of a multi-node training environment, a first training process to train the first machine learning model using a first training data set, wherein the first training process includes a first set of training iterations;
executing, at a second node of the multi-node training environment, a second training process to train the second machine learning model using the first training data set, wherein the second training process includes a second set of training iterations;
obtaining a replay request pertaining to the first machine learning model via the interactive interface, wherein the replay request indicates a plurality of training iterations performed during the training of the first machine learning model; and
causing, in response to the replay request, a video representation to be presented via the interactive interface, wherein the video representation is dynamically updated with data pertaining to the training of the first machine learning model across the plurality of training iterations during the first training process, wherein the data is obtained from the first node, and wherein the video representation presents an iteration-to-iteration comparison of the first and second training processes.

2. The computer-implemented method as recited in claim 1, further comprising:
obtaining, via the interactive interface, an indication of a selection of a particular internal layer of the second machine learning model from a plurality of internal layers of the second machine learning model, wherein at least a portion of the data with which the interactive interface is dynamically updated is obtained from the particular internal layer.

3. The computer-implemented method as recited in claim 1, wherein at least a portion of the data with which the interactive interface is dynamically updated comprises a loss function.

4. The computer-implemented method as recited in claim 1, wherein at least a portion of the data with which the interactive interface is dynamically updated comprises a test score.

5. The computer-implemented method as recited in claim 1, wherein at least a portion of the data with which the interactive interface is dynamically updated comprises an amount of time or resources consumed for individual iterations of the first training process.

6. The computer-implemented method as recited in claim 1, further comprising:
generating a reduced-dimension mapping of a multi-dimensional result obtained from the first machine learning model; and
causing the reduced-dimensional mapping to be presented via the interactive interface.

7. The computer-implemented method as recited in claim 1, further comprising:
causing a resource usage metric of the second machine learning model to be presented via the interactive interface.

8. A system, comprising:
one or more computing devices;
wherein the one or more computing devices include instructions that upon execution on or across the one or more computing devices cause the one or more computing devices to:
obtain, via an interactive interface, (a) a first visualization control request pertaining to a first machine learning model indicated by the interactive interface, and (b) a second visualization control request pertaining to a second machine learning model indicated by the interactive interface;
determine, based at least in part on the first and second visualization control requests, that dynamic updates of data pertaining to training of the second machine learning model is to be presented via the interactive interface;
execute, at a first node of a multi-node training environment, a first training process to train the first machine learning model using a first training data set, wherein the first training process includes a first set of training iterations;
execute, at a second node of the multi-node training environment, a second training process to train the second machine learning model using the first training data set, wherein the second training process includes a second set of training iterations;
cause, based at least in part on the second visualization control request, a video representation to be presented via at least a portion of the interactive interface, wherein the video representation is dynamically updated with data pertaining to the training of the second machine learning model during the second training process, wherein the data is obtained from the second node, and wherein the video representation presents an iteration-to-iteration comparison of the first and second training processes.

9. The system as recited in claim 8, wherein the one or more computing devices include further instructions that upon execution on or across the one or more computing devices further cause the one or more computing devices to:
obtain a log entry associated with the second machine learning model, wherein the log entry comprises a result of a first transformation applied to data in the first training data set produced by the second machine learning model; and
apply a reverse transformation to the result of the first transformation, wherein the data with which the interactive interface is dynamically updated comprises a result of the reverse transformation.

10. The system as recited in claim 8, wherein at least a portion of the data with which the interactive interface is dynamically updated comprises a gradient value.

11. The system as recited in claim 8, wherein at least a portion of the data with which the interactive interface is dynamically updated comprises a weight associated with a layer of the second machine learning model.

12. The system as recited in claim 8, wherein the one or more computing devices include further instructions that upon execution on or across the one or more computing devices further cause the one or more computing devices to:
obtain, from the first node of a multi-node training environment, a first set of log records pertaining to the first set of training iterations of the first machine learning model;
obtain, from the second node of the multi-node training environment, a second set of log records pertaining to the second set of training iterations of the second machine learning model;
perform correlation analysis to identify a first subset of the first set of log records which represent a particular training iteration that matches, with respect to an ordinal position of the particular training iteration within the first set of training iterations of the first machine learning model, another training iteration in the second set of training iterations represented by a second subset of the second set of log records; and
include, in the iteration-to-iteration comparison of the first and second training processes presented via the interactive interface, a result of comparison of contents of the first subset and the second subset of log entries.

13. The system as recited in claim 8, wherein the one or more computing devices include further instructions that upon execution on or across the one or more computing devices further cause the one or more computing devices to:
cause an alert indication to be displayed via the interactive interface in response to a determination that data associated with the second machine learning model satisfies a threshold criterion.

14. The system as recited in claim 8, wherein the one or more computing devices include further instructions that upon execution on or across the one or more computing devices further cause the one or more computing devices to:

obtain, via the interactive interface, a third visualization control request pertaining to a third machine learning model; and determine, based at least in part on the third visualization control request, that dynamic updates of data pertaining to training of the third machine learning model is not be presented via the interactive interface.

15. A computer-implemented method, comprising:

identifying a plurality of machine learning models, including a first machine learning model and a second machine learning model, for which representations of one or more parameters are to be displayed via one or more programmatic interfaces, wherein individual ones of the plurality of machine learning models are trained using a first training data set;

executing, at a first node of a multi-node training environment, a first training process to train the first machine learning model using the first training data set, wherein the first training process includes a first set of training iterations;

executing, at a second node of the multi-node training environment, a second training process to train the second machine learning model using the first training data set, wherein the second training process includes a second set of training iterations;

obtaining a replay request pertaining to the first machine learning model via the one or more programmatic interfaces, wherein the replay request indicates a plurality of training iterations performed during the training of the first machine learning model; and causing, in response to the replay request, a video representation to be presented via the one or more programmatic interfaces, wherein the video representation is dynamically updated with data pertaining to the training of the first machine learning model across the plurality of training iterations during the first training process, wherein the data is obtained from the first node, and wherein the video representation presents an iteration-to-iteration comparison of the first and second training processes.

16. The computer-implemented method as recited in claim 15, wherein the first parameter comprises one of: (a) a weight assigned to a subcomponent of the first machine learning model in a training iteration, (b) a bias assigned to a subcomponent of the first machine learning model in a training iteration, (d) a value of a loss function of the first machine learning model, (c) a result obtained from a test iteration of the first machine learning model, or (d) an output of a feature processing filter of the first machine learning model.

17. The computer-implemented method as recited in claim 15, further comprising:

causing a warning to be displayed via the one or more programmatic interfaces in response to a determination that data associated with the first machine learning model satisfies a threshold criterion.

18. The computer-implemented method as recited in claim 15, further comprising:

causing a recommendation to terminate training of the first machine learning model to be presented via the one or more programmatic interfaces.

19. The computer-implemented method as recited in claim 15, wherein the first machine learning model comprises a neural network.

20. The computer-implemented method as recited in claim 15, further comprising:

causing a resource usage metric of the second machine learning model to be presented via the one or more programmatic interfaces.

* * * * *